United States Patent
Nguyen et al.

(10) Patent No.: US 9,281,651 B2
(45) Date of Patent: Mar. 8, 2016

(54) LASER RESONATOR WITH PARASITIC MODE SUPPRESSION

(71) Applicant: Synrad, Inc., Mukilteo, WA (US)

(72) Inventors: Linh K. Nguyen, Woodinville, WA (US); Jason W. Bethel, Seattle, WA (US); Giang B. Nguyen, Renton, WA (US); Melvin J. Lima, Bothell, WA (US)

(73) Assignee: GSI Group Corporation, Bedford, MA (US)

( * ) Notice: Subject to any disclaimer, the term of this patent is extended or adjusted under 35 U.S.C. 154(b) by 0 days.

(21) Appl. No.: 14/265,779

(22) Filed: Apr. 30, 2014

(65) Prior Publication Data

US 2015/0318662 A1    Nov. 5, 2015

(51) Int. Cl.
H01S 3/08 (2006.01)
H01S 3/03 (2006.01)
H01S 3/081 (2006.01)
H01S 3/041 (2006.01)
H01S 3/06 (2006.01)

(52) U.S. Cl.
CPC ........... *H01S 3/08018* (2013.01); *H01S 3/0315* (2013.01); *H01S 3/041* (2013.01); *H01S 3/0606* (2013.01); *H01S 3/081* (2013.01); *H01S 3/0816* (2013.01); *H01S 3/08059* (2013.01); *H01S 3/08095* (2013.01)

(58) Field of Classification Search
CPC ..... H01S 3/0315; H01S 3/081; H01S 3/0813; H01S 3/0816; H01S 3/0818; H01S 3/041; H01S 3/0606; H01S 3/08095; H01S 3/08059

USPC ........................................ 372/19, 98, 103, 93
See application file for complete search history.

(56) References Cited

U.S. PATENT DOCUMENTS

| | | | |
|---|---|---|---|
| 3,614,659 A * | 10/1971 | Rigrod | 372/97 |
| 4,703,491 A | 10/1987 | Lim | |
| 4,719,639 A | 1/1988 | Tulip | |
| 5,048,048 A | 9/1991 | Nishimae et al. | |
| 5,123,028 A | 6/1992 | Hobart et al. | |
| 5,216,689 A | 6/1993 | Gardner et al. | |
| 5,353,297 A | 10/1994 | Koop et al. | |
| 5,661,746 A | 8/1997 | Sukhman et al. | |
| 5,946,330 A * | 8/1999 | Ozygus et al. | 372/19 |
| 6,192,061 B1 * | 2/2001 | Hart et al. | 372/87 |
| 6,256,332 B1 | 7/2001 | Anikitchev | |
| 6,370,178 B1 | 4/2002 | Papayoanou et al. | |
| 6,442,186 B1 * | 8/2002 | Vitruk | 372/95 |
| 6,603,794 B2 | 8/2003 | Bethel et al. | |
| 6,798,816 B2 | 9/2004 | DeMaria et al. | |
| 2012/0219028 A1 * | 8/2012 | Morrow et al. | 372/36 |

* cited by examiner

*Primary Examiner* — Kinam Park
(74) *Attorney, Agent, or Firm* — Osha Liang LLP

(57) ABSTRACT

The resonator includes a lasing medium having a thickness, a first mirror disposed at a first end of the lasing medium and a second mirror disposed at a second end of the lasing medium. The first and second mirror cooperate to fold an intra-cavity laser beam along a plurality of paths through the lasing medium, thereby defining a boundary of a superfluous region within the resonator, wherein the intra-cavity laser beam does not pass through the superfluous region. The first mirror and the second mirror form a laser resonator for a parasitic laser mode, a portion of which is located within the superfluous region. A parasitic mode suppressor is located within the superfluous region of the resonator.

21 Claims, 17 Drawing Sheets

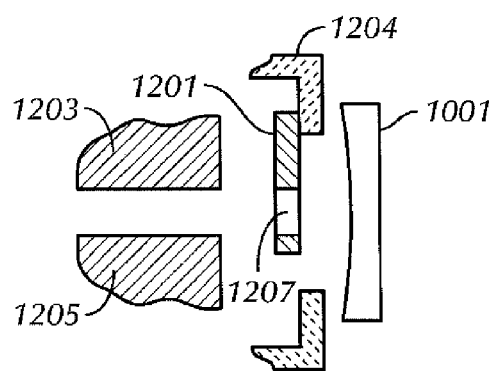
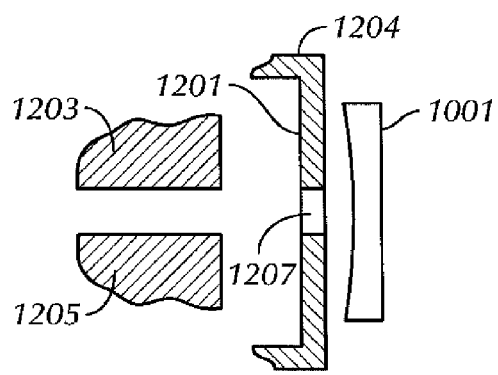
FIG. 12A　　　　　　　　　　FIG. 12B
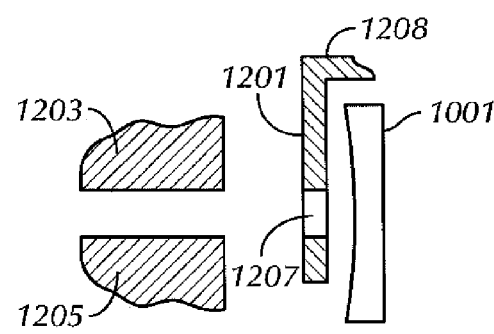
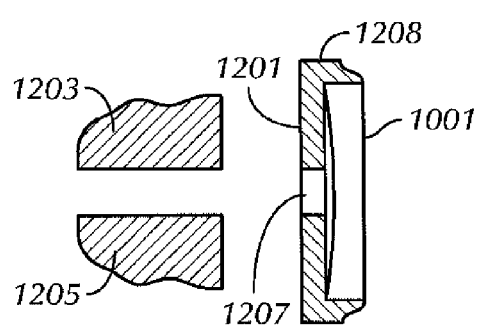
FIG. 12C　　　　　　　　　　FIG. 12D
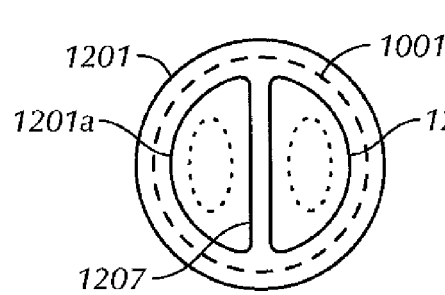
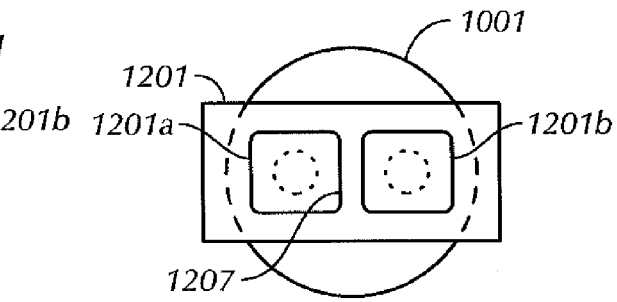
FIG. 12E　　　　　　　　　　FIG. 12F

LASER RESONATOR WITH PARASITIC MODE SUPPRESSION

BACKGROUND

Multi-pass laser resonators, also called multi-fold or folded laser resonators, are commonly used in lasers to achieve a long effective gain path while maintaining a short physical length for the resonator cavity. Although the folding of the beam path can occur in one, two or three dimensions, linearly folded multi-pass resonators have the advantage of being relatively easy to construct. Within the linear multi-pass configuration, complete free space, complete waveguide or hybrid operation can define the axes transverse to the beam path. While the use of a waveguide in the folded axis can constrain laser oscillation to a single mode, it is sometimes desirable to use free space propagation instead, due to the ability to more easily achieve a Gaussian beam in free space.

A multi-pass laser resonator, also referred to as a multi-pass optical cavity, may be formed by folding a stable single pass resonator one or more times via one or more mirrors. For example, FIG. 1A shows a stable single pass resonator 101 formed by two mirrors 103 and 105. Located between the two mirrors 103 and 105 is a gain medium 106 that causes an emission of electromagnetic energy that then builds up within the resonator 101. Due to the high reflectivity of the mirrors 103 and 105, most of the energy is contained within the resonator 101 and, as a result, an intra-cavity laser beam 107 is generated. The mirror 103, also commonly referred to as an output coupler, allows for a small fraction of the energy to leave the resonator in the form of output laser beam 109. The output laser beam 109 may be employed for a number of different uses, e.g., laser cutting, welding, marking, or any other use.

The intra-cavity laser beam 107 established between the mirrors 103 and 105 of the resonator 101 may oscillate in what is known as the fundamental mode of the resonator 101. The fundamental mode of the resonator 101 may be characterized, in part, by a particular beam shape in the transverse direction, i.e., in a direction that is perpendicular to the direction of propagation of the intra-cavity laser beam 107. For example, the fundamental mode of the resonator 101 may be characterized by a beam whose beam shape follows a Gaussian intensity distribution. As used herein, the radius of a Gaussian laser beam is defined to be the distance (from the center location of peak intensity in the beam) at which the intensity of the beam is reduced by a factor $1/e^2$. Furthermore, a waist $w_1$ of a Gaussian beam occurs at the longitudinal position on the beam having the smallest radius. For example, for the stable resonator shown in FIG. 1A having one flat mirror 103 and one concave mirror 105 separated by a distance L1, the waist $w_1$ of the intra-cavity Gaussian laser beam 107 occurs at the surface of the flat mirror 103. Furthermore in this configuration, the separation between the mirrors 103 and 107 define what is referred to as the path length of the inter-cavity laser beam 107. Thus, for the in-line resonator configuration shown in FIG. 1A, the physical length of the resonator is equivalent to the path length L1.

FIG. 1B shows another arrangement where the physical length of the resonator may be shorter than the path length of the inter-cavity laser beam 107. In FIG. 1B, a lengthening of the path length of the inter-cavity laser beam 107 may be achieved by including flat turning mirror 111 within the cavity. The effect of flat turning mirror 111 is to fold the path of the inter-cavity laser beam 107 without necessarily changing the nature of the stable resonator depicted in FIG. 1A. For example, in the folded configuration shown in FIG. 1B, the physical length of the resonator L2 is approximately half the path length L1 of the inter-cavity laser beam 107. As shown in FIG. 1B the laser beam 107 makes two passes through the gain medium 106 with the first pass represented by portion 107a of laser beam 107 and the second pass represented by portion 107b of laser beam 107. Because the inter-cavity laser beam takes two passes through the gain medium 106, the folded configuration may achieve a higher gain, and a correspondingly higher output power in the output laser beam 109.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Illustrative embodiments of the present disclosure are directed to a resonator for a laser. The resonator includes a first resonator wall and a second resonator wall. The second resonator wall is separated from the first resonator wall in a transverse direction thereby defining a gap between the first and second resonator walls with a lasing medium disposed in the gap. A first mirror is disposed at a first end of the first and second resonator walls and a second mirror disposed at a second end of the first and second resonator walls. The first and second mirror cooperate to fold an intra-cavity laser beam along a plurality of paths through the lasing medium. The plurality of paths define a boundary of a superfluous region within the resonator, wherein the intra-cavity laser beam does not pass through the superfluous region. The first mirror and the second mirror form a laser resonator for a parasitic laser mode, a portion of which is located within the superfluous region. A parasitic mode suppressor is located within the superfluous region of the resonator and is disposed between the first end of the first resonator wall and the first mirror.

Illustrative embodiments of the present disclosure are directed to a resonator for a laser. The resonator includes a lasing medium having a thickness, a first mirror disposed at a first end of the lasing medium and a second mirror disposed at a second end of the lasing medium. The first and second mirror cooperate to fold an intra-cavity laser beam along a plurality of paths through the lasing medium, thereby defining a boundary of a superfluous region within the resonator, wherein the intra-cavity laser beam does not pass through the superfluous region. The first mirror and the second mirror form a laser resonator for a parasitic laser mode, a portion of which is located within the superfluous region. A parasitic mode suppressor is located within the superfluous region of the resonator.

Other aspects of the invention will be apparent from the following description and the appended claims.

BRIEF DESCRIPTION OF DRAWINGS

FIGS. 12A-12I show parasitic mode suppressors in accordance with one or more embodiments of the invention.

DETAILED DESCRIPTION

Figure 1A:
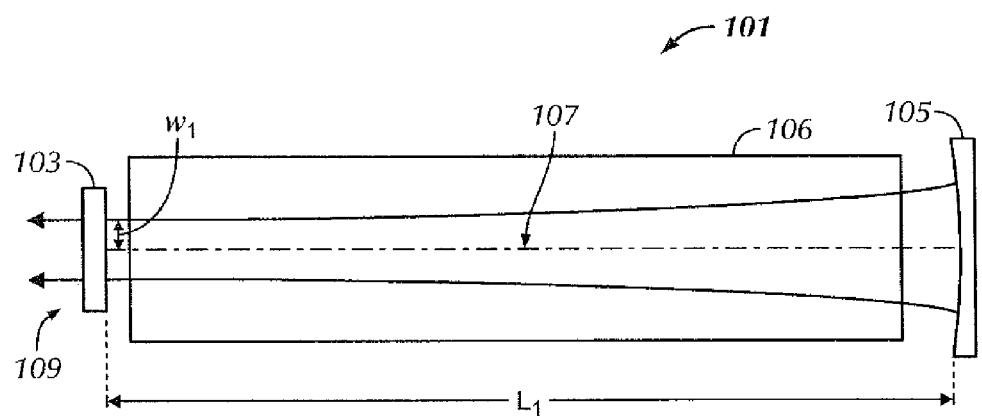
FIGS. 1A-1B show examples of laser resonators.
Figure 1B:
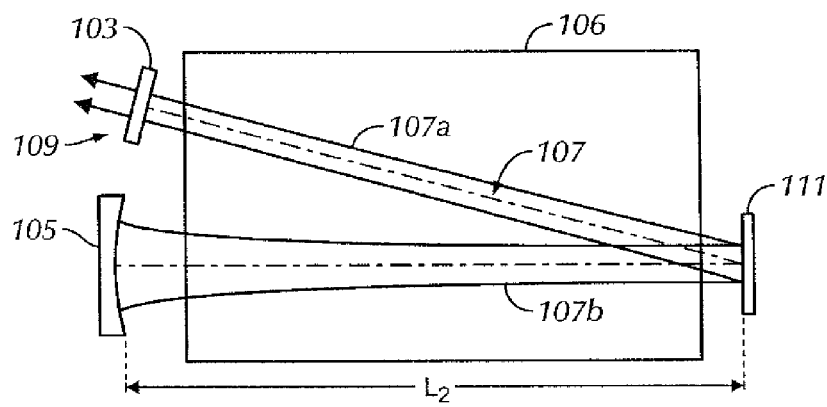

Specific embodiments of a laser resonator with parasitic mode suppression will now be described in detail with reference to the accompanying figures. Like elements in the various figures (also referred to as FIGS.) are denoted by like reference numerals for consistency.

In the following detailed description of embodiments, numerous specific details are set forth in order to provide a more thorough understanding of the laser resonator with parasitic mode suppression. However, it will be apparent to one of ordinary skill in the art that these embodiments may be practiced without these specific details. In other instances, well-known features have not been described in detail to avoid unnecessarily complicating the description.

In general, the present disclosure is directed to a laser resonator with parasitic mode suppression. In accordance with one or more embodiments, the parasitic mode suppression is accomplished by one or more parasitic mode suppressors that are affixed to, or an integrated part of, a solid state gain medium, one or more extension surfaces, extension members and shields. These mode-suppressors and/or extension surfaces, extension members and shields may be located near or adjacent to the mirrors of the resonator. The present invention takes advantage of the fact that the spatial separation between neighboring beams in a resonator is greatest at the ends of the resonator, which is defined by the mirrors. A spatial separation between the beams of the desired oscillation in the area of a parasitic oscillation is implemented so that the placement of the parasitic mode suppression structures serves to effectively suppress the parasitic oscillation while at the same time not substantially affecting, or interfering with, the desired laser oscillation.

In accordance with one or more embodiments, the laser resonator with parasitic mode suppression may be employed with a number of different types of laser gain media, also referred to herein as lasing media. For example, one or more embodiments of the resonator may operate to suppress parasitic laser oscillations within a gas discharge medium and/or a solid state gain medium.

Figure 2A:
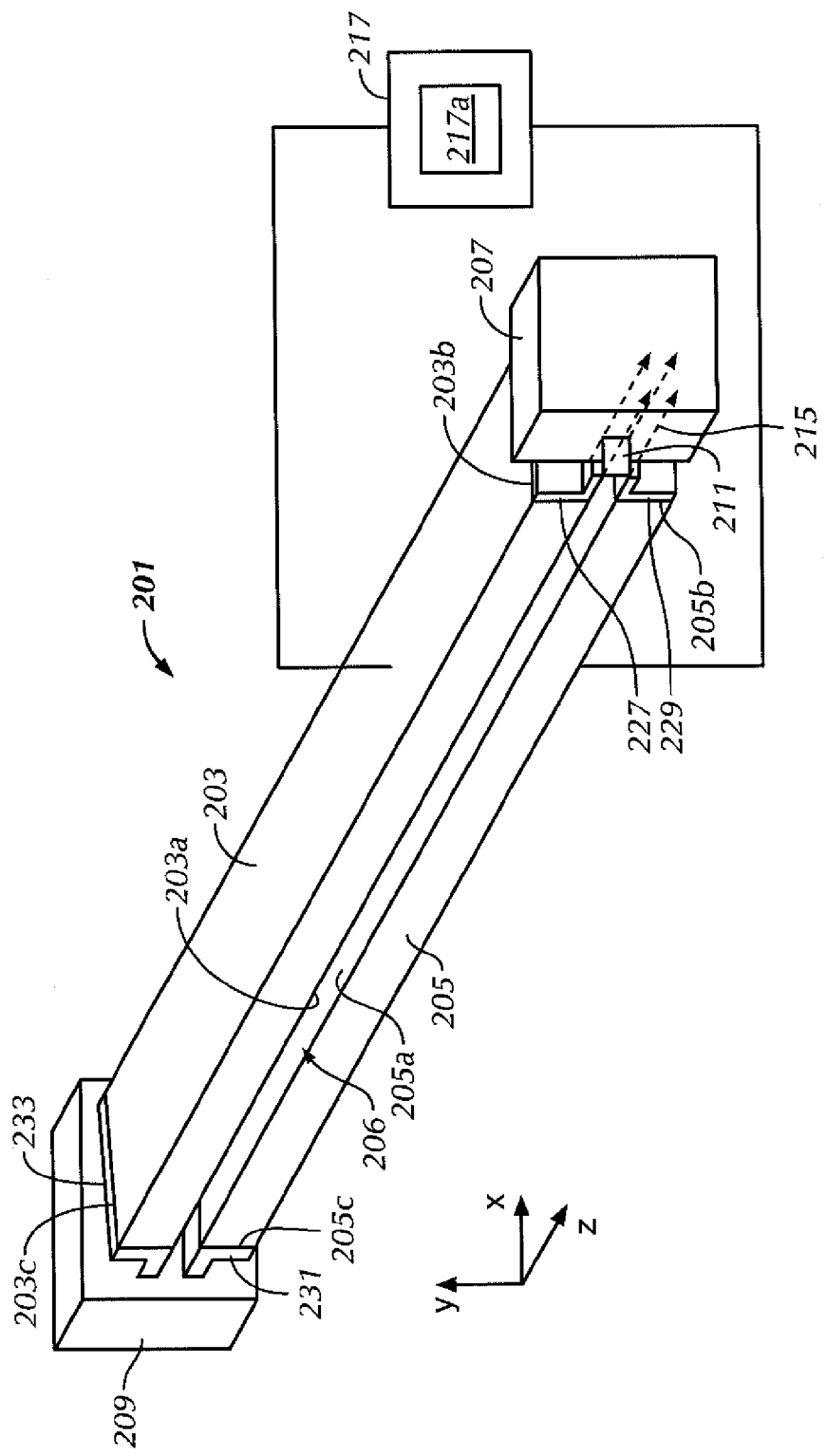
FIGS. 2A-2C show examples of a laser employing a laser resonator with parasitic mode suppression in accordance with one or more embodiments.

FIG. 2A shows an example of a laser employing a laser resonator, e.g., a multi-pass laser resonator with parasitic mode suppression in accordance with one or more embodiments. Before the details of the parasitic mode suppression structures are discussed, the general components of the laser shown in FIG. 2A will be discussed. More specifically, FIG. 2A shows one example of laser employing a laser resonator, e.g., multi-pass slab gas laser 201. However, other types of laser resonators may be employed without departing from the scope of the present disclosure. Furthermore, while the examples described herein may show resonator designs that employ a certain number of passes, e.g., 5 passes as shown below in FIG. 3A, a resonator employing any number of passes may be used without departing from the scope of the present disclosure. In accordance with one or more embodiments, the inter-electrode gap 206 is at least partially filled with a laser gain medium that serves as a discharge region. In accordance with one or more embodiments, the discharge region is defined to be the space between the inner surfaces 203a and 205a of the elongated planar electrodes 203 and 205, respectively. As described in further detail below, the inner surfaces 203a and 205a serve as two elongated resonator walls that bound the discharge region, and, in some embodiments, may also serve as waveguiding surfaces for the intra-cavity laser beam in the transverse direction (y-direction). While the example shown in FIG. 2A is a slab laser that employs planar electrodes 203 and 205, any electrode shape is possible without departing from the scope of the present disclosure. For example U.S. Pat. No. 6,603,794, incorporated by reference herein in its entirety, discloses a number of different electrode arrangements, e.g., contoured electrodes, tapered electrodes, and/or annular electrodes may be used.

Figure 3A:
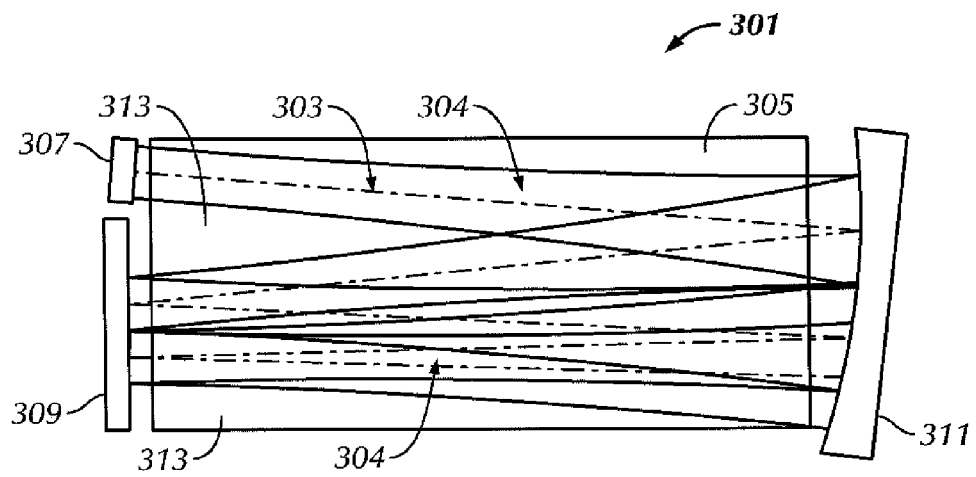
FIGS. 3A-3B show examples of slab resonators in accordance with one or more embodiments of the invention.

The slab laser 201 shown in FIG. 2A further includes an optical resonator that is formed between the output coupling mirror 211 and front multi-folding mirror 207. Further details of the optical resonator, including, e.g., the beam path of the intra-cavity laser beam through the optical resonator, are shown in FIG. 3A and discussed in more detail below. Furthermore, as described in more detail below in reference to the remaining FIGS., one or more parasitic mode suppressors (not shown) may be positioned within the optical resonator. In accordance with one or more embodiments, a pair of spherical optical elements may be used for the front and rear multi-folding mirrors 207 and 209, respectively, and a planar mirror may be used for the output coupling mirror 211. As an example, the radius of curvature of the rear spherical optic may be between 30 cm and 5 meters, while the radius of curvature of the front optic may be 30 cm and infinity (i.e. be planar). However, other embodiments may use radii of curvature outside this range without departing from the scope of the present disclosure. However, other embodiments may use spherical optics, cylindrical optics, toroidal optics, or generally aspherical optics, or any combinations thereof for the resonator without departing from the scope of the present disclosure. In addition, in accordance with one or more embodiments, the optics may be mounted to end flanges (not shown) that maintain vacuum integrity while at the same time providing suitable adjustment of the mirror tilt to enable optimum alignment of the constituent mirrors of the optical resonator.

In the slab laser example shown in FIG. 2A, the elongated planar electrodes 203 and 205 are part of an electrical resonator (which itself is part of the laser resonator) such that the inter-electrode gap bounded by the resonator surfaces 203a and 205a serves as a discharge region for the gas lasing medium. For example, such electrodes may have lengths of up to 1 meter, widths of up to 0.5 meters, and inter-electrode gaps on the order of 1-5 mm. However, other embodiments may use dimensions outside this range without departing from the scope of the present disclosure. In accordance with one or more embodiments, when radio frequency (commonly referred to as "RF") power is applied to the gas lasing medium via elongated planar electrodes 203 and 205, a gas discharge forms within the inter-electrode gap 206. As described in more detail below, laser energy builds up within one or more modes, including a fundamental mode, of the optical resonator, eventually forming an intra-cavity laser beam (not shown)

that travels back and forth between the output coupling mirror 211 and front multi-folding mirror 207 via rear multi-folding mirror 209. Some fraction of the intra-cavity laser beam is transmitted through the output coupling mirror 211 and forms output laser beam 215. Furthermore, as described in more detail below, one or more undesirable higher order lasing modes and/or parasitic lasing modes that might have developed between one or more mirrors within the optical resonator may be suppressed through the use of strategically placed parasitic mode suppressors. If allowed to persist, the parasitic and/or higher order modes may not only decrease the efficiency of the laser but may also decrease the output power and may also negatively affect the quality of the output laser spatial mode.

In the illustrative embodiment shown in FIG. 2A, the electrical resonator cavity, and consequently the gas discharge area, may be rectangularly shaped. However, alternative embodiments may employ a square, annular, or other electrical resonator cavities. The resonator surfaces 203a and 205a may be bare electrode surfaces or may also be plated electrode surfaces. Suitable materials for bare embodiments include metals such as aluminum and other metallic alloys. Plated embodiments may employ a ceramic material, such as alumina or beryllia, on the electrode surfaces.

Figure 2B:
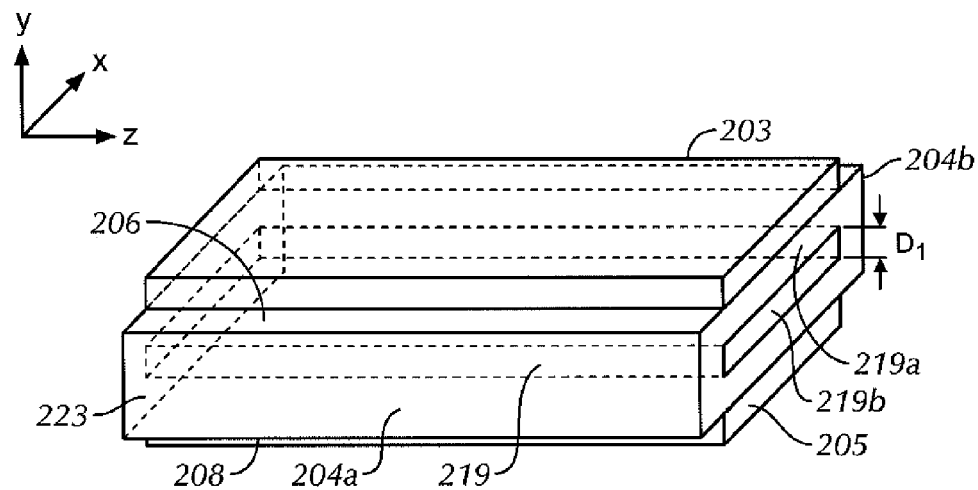

FIG. 2B, shows one example of an electrical resonator in accordance with one or more embodiments. The electrical resonator may be formed from a ceramic body 223 that is sandwiched between the pair of elongated planar electrodes 203 and 205. The ceramic body 223 includes an open-ended inner cavity 219 within which is located the laser gain medium. In this example, the open-ended inner cavity 219 includes elongated sidewalls 204a and 204b that join elongated top wall 206 with elongated bottom wall 208. Similar to the process described above in reference to FIG. 2A, radio frequency power may be applied to a gas lasing medium located within the open-ended inner cavity 219 via the elongated planar electrodes 203 and 205. Consequently, for examples where the laser gain medium is a gas, a gas discharge forms within the semi-closed inner cavity 219. Thus, in this embodiment, the ceramic inner cavity surfaces 219a and 219b form the two elongated resonator walls that bound the discharge region and, in some embodiments, may also serve as waveguiding surfaces for the intra-cavity laser beam in the transverse direction (y-direction).

As alluded to above, in accordance with one or more embodiments, the inter-electrode gap region (or inner cavity region) may be filled with a gas lasing medium. For example, the gas lasing medium may be a mixture of one part carbon dioxide ($CO_2$), one part nitrogen ($N_2$), and three parts helium (He), with the addition of 5% xenon (Xe). The gas pressure may be maintained in a range of approximately 30-150 Torr, e.g., 90 Torr. However, other embodiments may use higher pressures without departing from the scope of the present disclosure. Other embodiments of the invention may use other types of gas lasers, examples of which are listed in Table 1.

TABLE 1

| Type of Laser | Gas Lasing Medium |
| --- | --- |
| Carbon Dioxide | Some mixture of He, $N_2$, $CO_2$ and other gases such as Xe, $O_2$, and $H_2$. |
| Carbon Monoxide | Some mixture of He, $N_2$, CO, and other gases such as Xe, $CO_2$, $O_2$, and $H_2$. |
| Helium Cadmium | Some mixture of including He: Cd, including other inert gases |
| HeNe Lasers | Some mixture of He, Ne, including other inert gases |

TABLE 1-continued

| Type of Laser | Gas Lasing Medium |
| --- | --- |
| Krypton Ion Lasers | Some mixture of Kr, He, including other inert gases |
| Argon Ion Lasers | Some mixture of Ar, He, including other inert gases |
| Xenon | Xe, including other inert gases |
| Argon Xenon Lasers | Some mixture of Ar, Xe, He |
| Copper Vapor Laser | He/Ne + copper vapor (metal at high temp) + traces of other gases including $H_2$ |
| Barium Vapor Laser | He/Ne + Barium vapor |
| Strontium Vapor Laser | He/Ne + Strontium vapor |
| Metal Vapor Laser | Almost any metal vapor will lase given the right mixture of gases, temperature, and excitation conditions |
| Metal Halide Vapor Lasers | Almost all the above metals will also lase in their respective halide compounds, at lower temperatures, under slightly different excitation conditions |
| Excimer lasers | XeCl, XeF, ArF |
| Chemical lasers | HF, DF |
| Atmospheric lasers | Atmospheric gas |
| Nitrogen lasers | $N_2$, plus others |
| Sulphur, Silicon | Vapors of these elements |
| Iodine, Bromine, Chlorine | Vapors of these elements |
| COIL | Chemical Oxygen Iodine Laser |

Other gas mixtures may be used as well. For instance, some embodiments may use the following gas mixtures, or their isotopes, including portions of neon (Ne), carbon monoxide (CO), hydrogen ($H_2$), water ($H_2O$), krypton (Kr), argon (Ar), fluorine (F), deuterium, or oxygen ($O_2$) and other gases, examples of which are listed in Table 1 above, at various other gas pressures, e.g., 30-120 Torr, e.g., 50 Torr; however, it will be appreciated that other gaseous lasing media may also be employed. For instance, one example of a lasing medium includes one or more of the following vapors: copper, gold, strontium, barium, a halide compound of copper, a halide compound of gold, a halide compound of strontium, a halide compound of barium, and other vapors, examples of which are identified but not limited to those shown in Table 1 above.

Returning to FIG. 2A, in accordance with one or more embodiments, the slab laser 201 includes a power supply 217 that supplies excitation energy to the gas lasing medium located within gap 206 via the first and second elongated planar electrodes 203 and 205, respectively. Accordingly, the addition of excitation energy causes the gas lasing medium to emit electromagnetic radiation in the form of laser beam 215 that ultimately exits the optical resonator by way of output coupling mirror 211. Included with the power supply 217 is a radio frequency generator 217a that applies the excitation energy to the first and second elongated planar electrodes 203 and 205. In accordance with one or more embodiments, the radio frequency generator may operate at a frequency of 81 MHz with an output power level of at least 300 W. Other embodiments may use other excitation frequencies and power levels without departing from the scope of the present disclosure. Furthermore, in accordance with one or more embodiments, the radio frequency generator may be connected to the electrodes in a bi-phase fashion such that the phase of the voltage on one of the first and second elongated planar electrodes 203 and 205 is shifted substantially 180 degrees relative to the voltage on the other of the first and second elongated planar electrodes 203 and 205. The bi-phase excitation may be accomplished by any technique known in the art, e.g., by the placement of inductors between the first and second electrodes. In accordance with one or more alternative embodiments, the radio frequency generator may be connected to one of the first and second elongated planar electrodes, such that only one of the first and second elongated planar electrodes is excited.

Figure 2C:
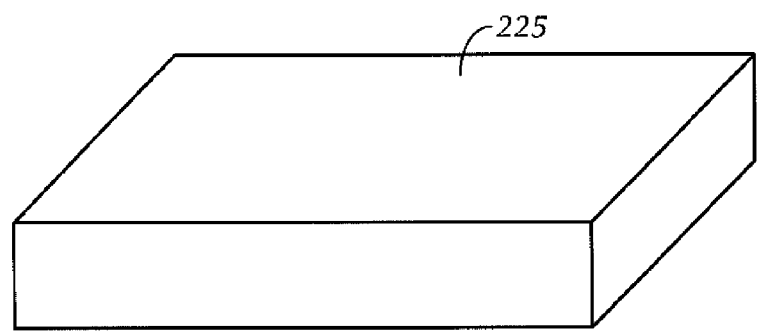

The excitation energy supplied by the power supply 217 in the embodiment shown in FIG. 2A may be radio frequency energy, but may also be associated with microwave, pulsed, continuous wave, direct current, or any other energy source that may suitably stimulate a lasing medium into producing laser energy. Furthermore, additional embodiments may utilize other forms of excitation including an optically pumped solid-state laser gain medium similar to that shown in FIG. 2C. In this example, the solid state material 225 may be excited by way of a flashlamp (not shown) or laser diode (not shown).

In accordance with one or more embodiments, the inner surfaces 203a and 205a of the first and second elongated planar electrodes 203 and 205, respectively, are positioned sufficiently close to each other so that the inter-electrode gap acts as a waveguide along the y-axis for the laser radiation. Accordingly, when acting as waveguide surfaces, the inner surfaces 203a and 205a also act as optical resonator surfaces in the transverse direction (y-direction). In accordance with one or more embodiments, waveguiding occurs when $\pi N<1$, where $N=D^2/(4\lambda L)$ is the Fresnel number of the guide and D is the width of the gap between the electrodes, L is the length of the optical cavity, and $\lambda$ is the wavelength of the laser radiation. For a wavelength of about 10.6 microns, which is a common wavelength produced by a $CO_2$ laser, the waveguiding criterion is satisfied if the inter-electrode gap is less than 2 mm for a guide length of 40 cm. However, in other embodiments, the inter-electrode gap is large enough to allow for free space propagation, e.g., Gaussian beam propagation, of the laser beam in the y-direction. Accordingly, in this free space configuration, these surfaces serve to define the thickness of the gas discharge region without acting as a waveguide for the laser radiation. Other embodiments may use an inter-electrode gap that is between the waveguiding criterion and complete free space propagation.

FIG. 3A shows a stable multi-pass slab resonator 301 that may be used as the optical resonator discussed above in reference to FIG. 2A in accordance with one or more embodiments of the invention. In the multi-pass slab resonator 301, an intra-cavity laser beam 303 passes multiple times through a lasing medium 305, thereby forming the multi-pass optical resonator 301. In accordance with one or more embodiments, the multi-pass optical resonator 301 may use an output-coupling mirror 307, a front multi-folding mirror 309, and a rear multi-folding mirror 311. The front multi-folding mirror 309 and a rear multi-folding mirror 311 may be aligned to induce a certain number of passes of the intra-cavity laser beam 303 through the lasing medium 305, e.g., five passes in the example shown in FIG. 3A. As shown in FIG. 3A, the lasing medium 305 may be divided into two or more regions including one or more gain producing regions 304 and one or more superfluous regions, e.g., triangularly shaped superfluous regions 313. As used herein, the areas or regions of lasing medium 305 that are traversed by the intra-cavity laser beam 303 are defined to be the gain producing regions 304 and the areas or regions not traversed by the intra-cavity laser beam 303 are defined to be the superfluous regions 313. For example, FIG. 3A shows superfluous regions 313 that are not traversed by the intra-cavity beam 303 and thus are superfluous regions in the sense that they are not necessary for lasing to occur.

Figure 3B:
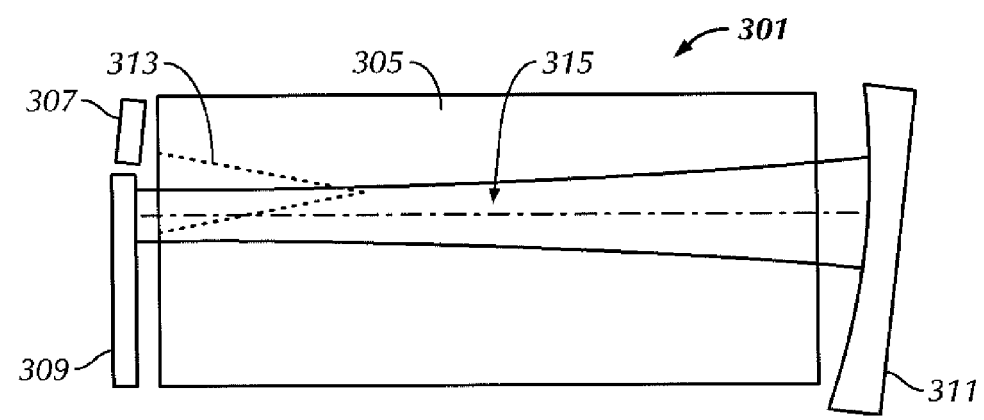

Furthermore, as shown in FIG. 3B, depending on their relative alignment, front multi-folding mirror 309 and rear multi-folding mirror 311 may support the formation of a parasitic laser oscillation 315 that may oscillate in the fundamental mode of the stable resonator that is formed between multi-folding mirror 309 and rear multi-folding mirror 311. For example, as shown in FIG. 3B, a parasitic laser oscillation 315 may form and pass through the lasing medium 305 if the tilt between the multi-folding mirrors 309 and 311 is small. For certain alignments, the parasitic laser oscillation 315 may be made to overlap with one or more of the superfluous regions 313 not traversed by the intra-cavity beam 303. Thus, in accordance with one or more embodiments, structures placed within the superfluous regions 313 may be used to suppress the parasitic oscillation 315 and increase the efficiency of the lasing medium 305 by minimizing or eliminating the parasitic use of the gain medium 305 by the parasitic laser oscillation 315. Furthermore, structures placed within the superfluous regions 313 may also be used to inhibit higher-order modes of the optical resonator. Inhibition of laser oscillation in the higher order modes leads to a beneficial concentration of more laser power in the fundamental mode of the optical resonator and it is this laser oscillation in the fundamental mode of the optical resonator that yields the desired intra-cavity beam 303. In accordance with one or more embodiments, the superfluous regions 313 may further be used to increase the efficiency of the lasing medium 305 by minimizing or eliminating unnecessary excitation areas. Additionally, the superfluous regions 313 may be used to tune the electrical properties within the lasing medium 305, e.g., to tune the capacitance of the inter-electrode gap described above in reference to FIGS. 2A-2B.

Figure 4A:
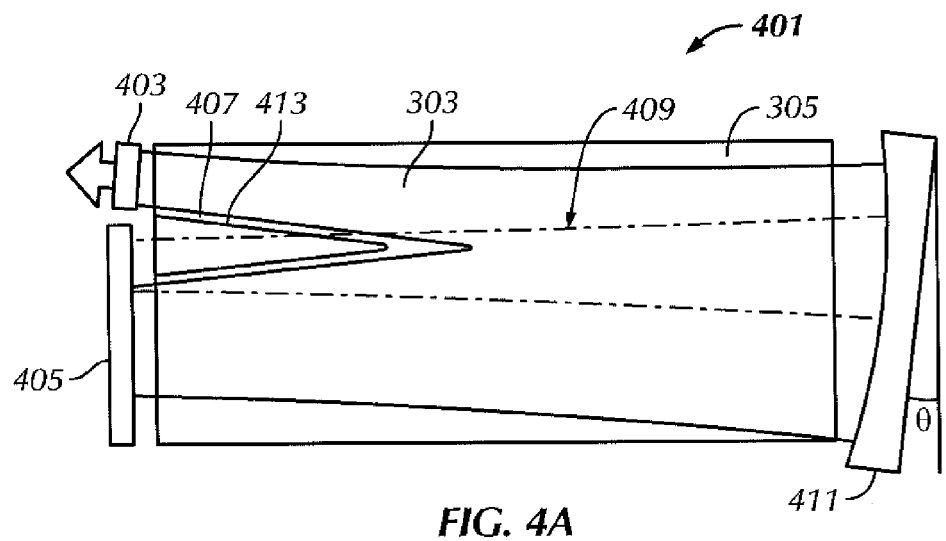
FIGS. 4A-4D show examples of slab resonators in accordance with one or more embodiments of the invention.

In accordance with one or more embodiments, FIG. 4A shows a multi-pass resonator 401 with parasitic mode suppression in accordance with one or more embodiments. As described above in reference to FIGS. 2-3, an optical resonator is formed between the output coupling mirror 403 and the front multi-folding mirror 405. As described above in reference to FIG. 3A, a superfluous region 407 may be made to overlap with at least a portion of a parasitic laser mode 409. In the example shown in FIG. 4A, the partial spatial overlap of the parasitic laser mode 409 with the superfluous region 407 is accomplished by tilting the rear multi-folding mirror 411 by the angle θ. In the multi-pass resonator 401 shown in FIG. 4A, the formation of parasitic mode 409 is suppressed by the presence of a parasitic mode suppressor 413 within at least a portion of the superfluous region 407. For example, the parasitic mode suppressor 413 may be substantially the same shape as the a superfluous region 407, e.g., the parasitic mode suppressor 413 may have a substantially triangular shape. The parasitic mode suppressor may be made out of a metal material, such as aluminum, or a ceramic material, such as alumina, or any combination thereof. Furthermore, metallic parasitic mode suppressors may be anodized or non-anodized. In accordance with one or more embodiments, a parasitic mode suppressor made out of reflective material may be shaped so as to reflect light away from a parasitic oscillation. Generally, the material(s) used for the parasitic mode suppressor may absorb, scatter, or deflect light that would otherwise contribute to a parasitic mode, without interfering with proper laser operation. Several examples of these intra-cavity parasitic mode suppressors are described below in reference to FIGS. 5-8.

Figure 4B:
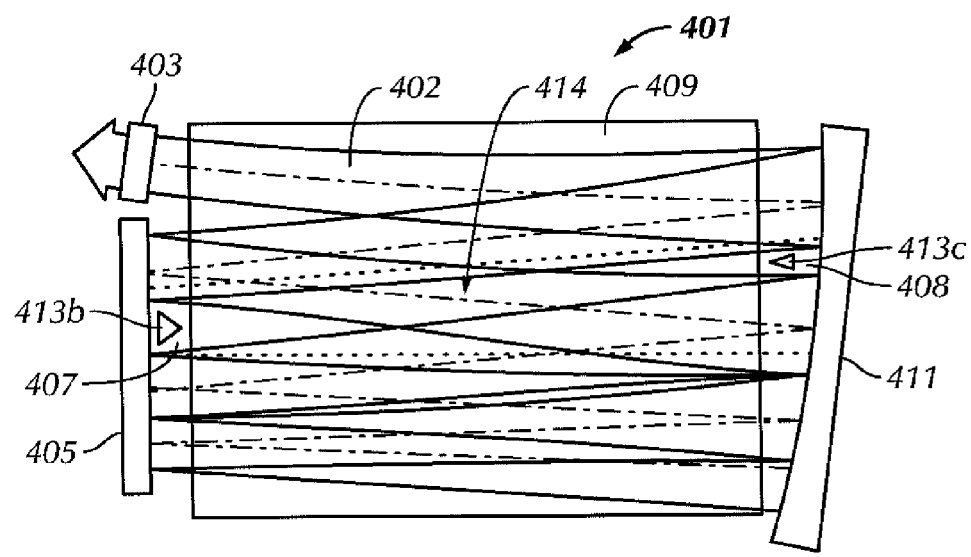

FIG. 4B shows another example of a multi-pass resonator 401 with parasitic mode suppression in accordance with one or more embodiments. In a manner generally similar to the resonator described above in reference to FIG. 4A, the multi-pass optical resonator 401 is formed between the output coupling mirror 403 and front multi-folding mirror 405 via rear multi-folding mirror 411. As before, the intra-cavity laser beam 402 traverses the laser gain medium 409 a number of times, e.g., seven times in the embodiment shown in FIG. 4B. Likewise, a number of superfluous regions may exist, e.g., superfluous regions 407 and 408 exist in the resonator and thus, may be used for parasitic mode suppression. However, rather than employing parasitic mode suppressors located within the portion of the superfluous area 407 that is within the lasing medium 409, as shown above in FIG. 4A, the formation of parasitic mode 414 (shown as bounded by the dotted lines in FIG. 4B) is suppressed by mounting parasitic mode suppressors 413b and 413c outside of the gain medium 409, e.g., by attaching the parasitic mode suppressors to respective extension members (not shown) that themselves may be attached, e.g., to the longitudinal ends of the resonator walls. While two parasitic mode suppressors are shown in this embodiment, any number of parasitic mode suppressors (including only one) may be used without departing from the scope of the present disclosure. The parasitic mode suppressor 413b may be mounted between the extension members 227 and 229, and the parasitic mode suppressor 413c may be mounted between extension members 231 and 233, as shown above in reference to FIG. 2A. In accordance with one or more embodiments, the extension member parasitic mode suppressors may, or may not, cause waveguiding of the intra-cavity laser beam 402 in the transverse dimension. Several other examples of parasitic mode suppressors are described in more detail below in reference to FIGS. 9-12.

Figure 4C:
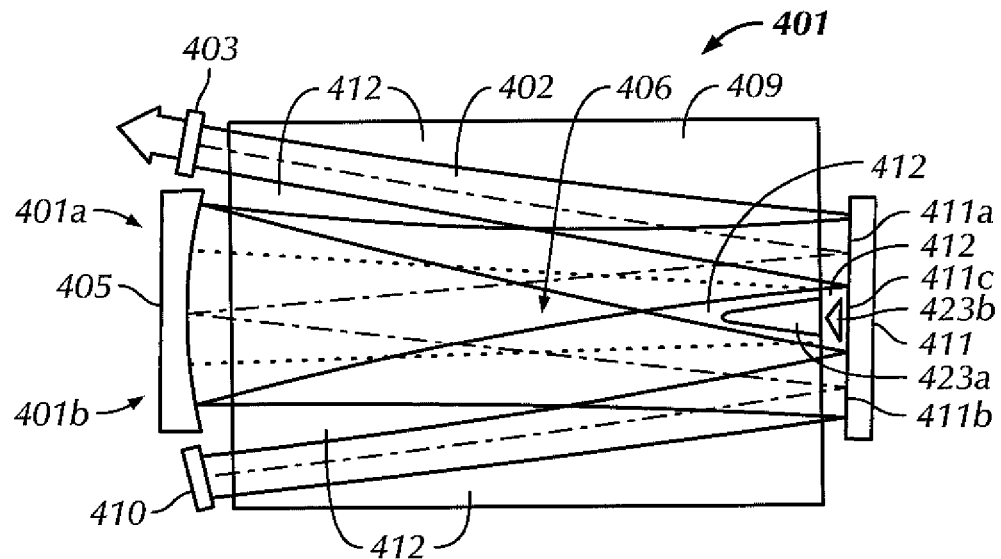

FIG. 4C shows another example of a multi-pass a resonator 401 in accordance with one or more embodiments. Such an arrangement results in a total of four passes of the intra-cavity laser beam 402 through the lasing medium 409. The example shown in FIG. 4C is a multi-pass resonator that is formed by utilizing two cascaded folded stable resonators 401a and 401b. Folded stable resonator 401a is formed between an output-coupling mirror 403 and a front multi-folding mirror 405. Likewise, folded stable resonator 401b is formed between the main front multi-folding mirror 405 and satellite mirror 410. In accordance with one or more embodiments, the two folded stable resonators 401a and 401b share a common rear multi-folding mirror 411, thereby allowing for a reduction in the complexity of the optical alignment process. In accordance with one or more embodiments, the intra-cavity laser beam 402 may oscillate in the fundamental mode of the resonator formed by the cascaded arrangement of stable resonators 401a and 401b.

In accordance with one or more embodiments, in order to improve symmetry and prevent instability of the entire multi-pass resonator, the radius of curvature R of the output-coupling mirror 403 may be chosen to be approximately equal to the radius of curvature of the satellite mirror 410. For example, in one illustrative embodiment, the output-coupling mirror 403 and satellite total reflector 410 are both flat ($R=\infty$) so that the waist of the intra-cavity laser beam 402 occurs at either end of the multi-pass resonator, i.e., at the output-coupling mirror 403 and at the satellite total reflector 410.

In accordance with one or more embodiments, due to the use of the common rear multi-folding mirror 411, a secondary stable resonator is formed between the main front multi-folding mirror 405 and the common rear multi-folding mirror 411. This secondary stable resonator leads to the formation of parasitic mode 406 (delimited by the dotted line in FIG. 4C), similar to that described above in reference to FIGS. 4A-4B. As was the case for the resonators described above in reference to FIGS. 4A-4B, the alignment of the mirrors of the multi-pass resonator 401 is configured such that the parasitic mode 406 overlaps one or more superfluous regions 412. In the example shown in FIG. 4C, the intra-cavity laser beam 402 impinges upon the outer portions 411a and 411b of the common turning mirror 411, but does not impinge upon either the center portion 411c of the common turning mirror 411 or the superfluous region 412 of the lasing medium 409 that is near the central portion 411c. Furthermore, this alignment places the center portion 411c of the common turning mirror precisely at a position where the parasitic mode 406 will develop. However, at least with respect to the intra-cavity laser beam 402, center portion 411c of the common turning mirror and region 412 of the lasing medium may be considered superfluous regions because these regions are unnecessary for the proper oscillation of the fundamental mode of the cavity represented by the intra-cavity laser beam 402.

In accordance with one or more embodiments, one or more mode suppressing structures 423a and 423b may be located inside the laser gain medium 409 and outside the laser gain medium 409, respectively. For example, the mode suppressing structures may be located inside and/or outside the inter-electrode gap, as described in more detail below in reference to FIGS. 5-12. In other embodiments, one or more other mode suppressors may also be located in any superfluous region that is not traversed by the fundamental mode of the cavity represented by the intra-cavity laser beam 402 and thus, the positioning of the mode suppressing structures need not be limited to positions that correspond to the locations of parasitic modes. For example, mode suppressing structures may be located within any of the superfluous regions 412 shown in FIG. 4C.

Figure 4D:
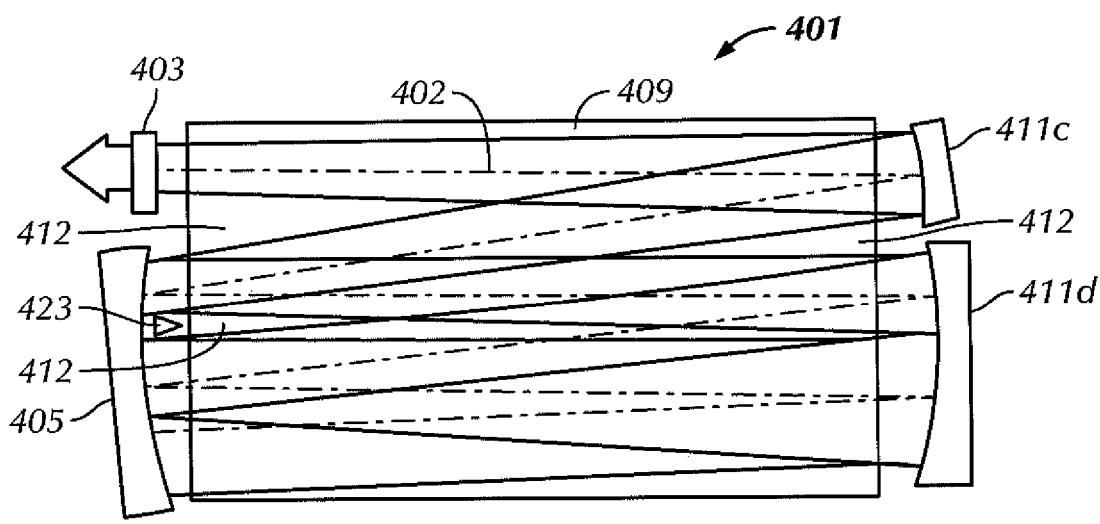

FIG. 4D shows another example of a multi-pass a resonator 401 in accordance with one or more embodiments. Such an arrangement results in a total of six passes of the intra-cavity laser beam 402 through the lasing medium 409. The example shown in FIG. 4D is similar to that shown in FIG. 4B with the modification that the resonator shown in FIG. 4D is formed by utilizing two rear folding mirrors 411c and 411d in place of the single folding mirror 411 of FIG. 4C. Thus, the multi-pass optical resonator 401 is formed between the output coupling mirror 403 and front multi-folding mirror 405. As before, the intra-cavity laser beam 402 traverses the laser gain medium 409 a number of times, e.g., six times in the embodiment shown in FIG. 4D. Likewise, a number of superfluous regions may exist, e.g., superfluous regions 412 exist in the resonator and thus, may be used for parasitic mode suppression, e.g., by placing parasitic mode suppressor 423 outside of the gain medium 409, e.g., by attaching the parasitic mode suppressors to respective extension members (not shown) that themselves may be attached, e.g., to the longitudinal ends of the resonator walls. While one parasitic mode suppressor is shown in this embodiment, any number of parasitic mode suppressors may be used without departing from the scope of the present disclosure. In accordance with one or more embodiments, the parasitic mode suppressor 423 may be mounted between extension members 227 and 229, as shown above in reference to FIG. 2A. In accordance with one or more embodiments, the extension member parasitic mode suppressors may, or may not, cause waveguiding of the intra-cavity laser beam 402 in the transverse dimension. Several other examples of parasitic mode suppressors are described in more detail below in reference to FIGS. 9-12.

In accordance with one or more embodiments, the presence of one or more mode suppressing structures suppresses gain of the resonator with respect to the parasitic mode and thus increases the overall efficiency of the laser resonator with respect to the fundamental mode. Furthermore, the presence of one or more mode suppressing structures may also inhibit higher-order modes of the resonator, thereby improving the efficiency and output mode quality of the laser resonator.

Additionally, for the case of a gas discharge laser that includes a gain region that is located within two elongated electrodes as described above, the presence of the mode suppressing structures may be used to tune desired electrical properties in the cavity, e.g., to achieve a higher capacitance between the resonator walls or, for gas discharge lasers, higher field areas facilitating a discharge.

In all the examples that follow in FIGS. 5-8, a parasitic mode suppressor may be formed by a recess in, and/or a protrusion on, a resonator wall of the resonator. For example, the wall on which a parasitic mode suppressor is located may be one or more inner surfaces of the first and second elongated planar electrodes that bound the inter-electrode gap, like that shown in FIG. 2A. In other examples, the resonator wall on which a parasitic mode suppressor is located may be one or more inner surfaces that bound an open-ended inner cavity of a ceramic body, like that shown in FIG. 2B. In other embodiments using a solid-state gain medium, the parasitic mode suppressor may be embedded in the solid-state medium, with or without a surface of the parasitic mode suppressor being coplanar with one or more resonator wall surfaces.

Figure 5A:
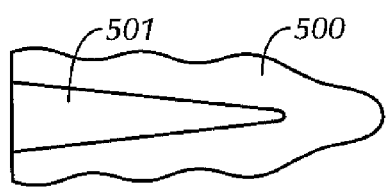
FIGS. 5A-5E show parasitic mode suppressors in accordance with one or more embodiments of the invention.
Figure 5B:
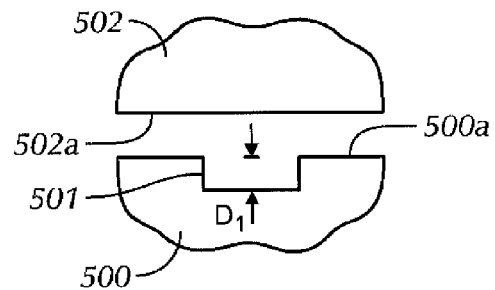

FIG. 5A shows a top view of resonator 500 having a parasitic mode suppressor 501 formed as a triangular-shaped recess in the wall of resonator 500. While the recess shown in FIG. 5A is triangular in shape, any shape may be used without departing from the scope of the present disclosure. FIG. 5B shows a cross-sectional view of the same recess-type parasitic mode suppressor 501. In the example shown in FIG. 5B, the recess-type parasitic mode suppressor 501 is formed on resonator wall 500a. In other embodiments, a recess may alternatively be formed in the opposing resonator wall, e.g., in resonator wall 502a.

Figure 13:
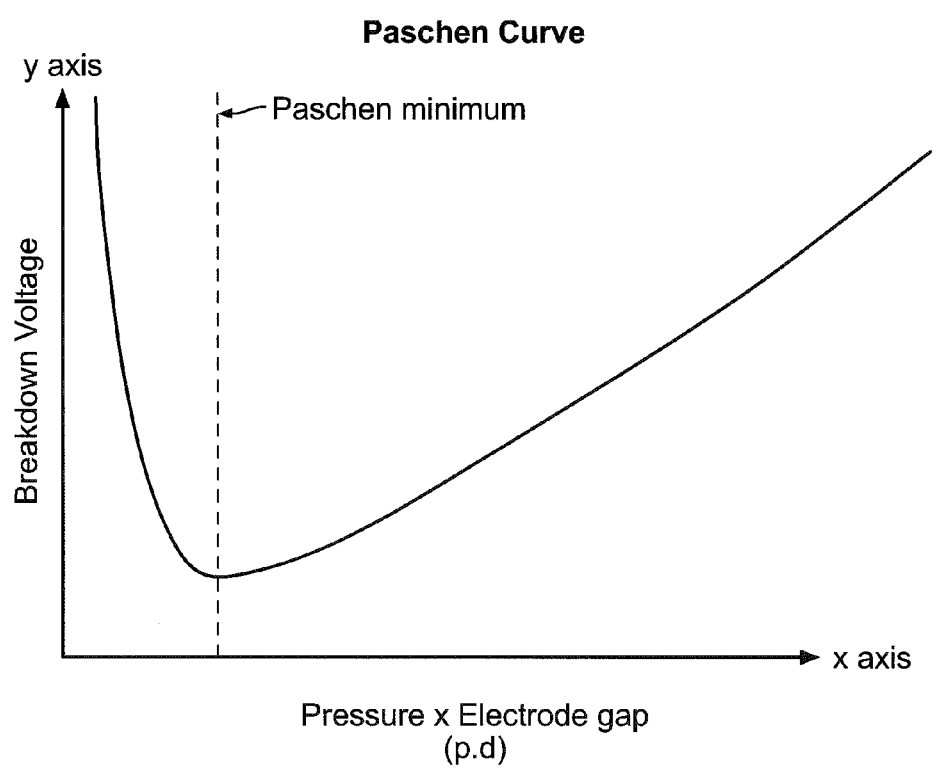
FIG. 13 shows a Paschen Curve in accordance with one or more embodiments.

In embodiments that employ a gaseous gain medium, e.g., in gas discharge laser embodiments, the depth D1 of the recess-type parasitic mode suppressor 501 may be chosen to substantially reduce, or even eliminate, the gas discharge in the area of the recess. In other words, the presence of the recess-type parasitic mode suppressor 501 acts to substantially reduce, or even eliminate gas discharge in the superfluous region, e.g., superfluous region 407 shown in FIG. 4. The minimum depth D1 needed to suppress the gas discharge depends on the technical details of how the electrical excitation of the lasing medium is provided and also depends on the type and composition of the gaseous mixture that is used as the lasing medium within the discharge region. For example, the breakdown voltage may be described as depending on the product of gap size and gas pressure and generally follows what is known as the Paschen Curve, an example of which is shown in FIG. 13. Accordingly, for a given gas pressure, the minimum depth D1 should be chosen such that the breakdown voltage of the inter-electrode gap plus D1 always exceeds the excitation voltage available in the resonator structure. For example, the depth D1 may be chosen to be at least equal to the inter-electrode gap, thereby making an effective gap that is at least twice the inter-electrode gap, although any appropriate depth may be chosen without departing from the scope of the present disclosure. For example, for an inter-electrode gap of 2 mm, a minimum depth of 2 mm may be chosen, for a full gap of 4 mm.

The substantial reduction and/or elimination of gas discharge in the superfluous region leads to a corresponding substantial reduction and/or elimination of the gain in the superfluous region. Consequently, without an effective gain medium in the superfluous region, the parasitic oscillation, e.g., parasitic oscillation 309 shown in FIG. 3 (or parasitic oscillation 409 in FIG. 4), may be prevented from establishing itself inside the resonator.

In accordance with one or more embodiments, the recess-type parasitic mode suppressor 501 may also be sized so as to eliminate the gain available to higher-order modes of the desired oscillation. For gas discharge lasers in which modes perpendicular to the resonator walls are waveguide in nature, the presence of recess-type parasitic mode suppressor 401 disperses any oscillation passing above the area of recess-type parasitic mode suppressor 401, thereby additionally increasing the losses for a parasitic oscillation and any higher-order modes. For example, in the case of Gaussian beam propagation in rectangular symmetry, the beam radius of a higher-order mode is greater than that of the fundamental mode by a factor of sqrt(2m+1), where m=1 is the first higher-order mode, m=2 is the second high-order mode, etc. Therefore, in order to inhibit certain higher-order modes (m>1), the size of the parasitic mode suppressor should be chosen such that it is large enough to obstruct the beam radius of the higher-order modes but not the fundamental mode (m=0).

Figure 5C:
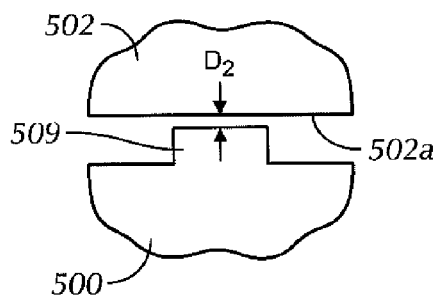
Figure 5D:
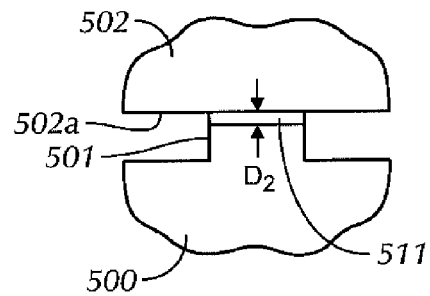

In accordance with one or more embodiments, the parasitic mode suppressor may be a protrusion on the resonator wall as shown in the cross-sectional view of FIG. 5C. Such a protrusion-type parasitic mode suppressor 509 may be formed as part of the inner surface 500a of the resonator wall 500. In an embodiment where the protrusion-type parasitic mode suppressor 509 is formed directly as part of the surface of an electrode, e.g., elongated electrode 203 and 203 shown in FIG. 2A, a distance D2 may separate the protrusion-type parasitic mode suppressor 509 from the opposing surface 502a of resonator wall 502 in order to prevent an electrical short from occurring between the electrodes. In addition, as shown in FIG. 5D, a layer 511 of an electrically insulating material may be disposed between the protrusion-type parasitic mode suppressor 509 and the opposing surface 502a. In other embodiments, as shown in FIG. 5E, a layer 513 of an electrically insulating material may be partially inserted into a recess 515 in the opposing wall.

Figure 5E:
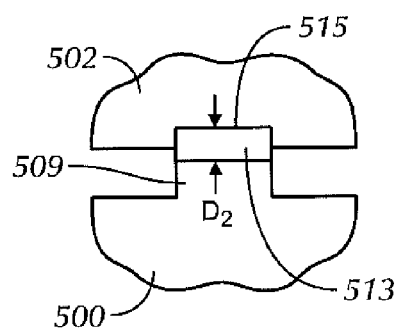

In gas discharge lasers, a protrusion-type parasitic mode suppressor 509 as shown in FIGS. 5C-5E may also serve to suppress unwanted gas discharge if the separation distance D2 is smaller than a certain value. The maximum separation distance D2 needed to suppress a discharge depends on the excitation of the lasing medium. Referring to the Paschen Curve shown in FIG. 9, the maximum separation distance D2 can be understood as the value occurring to the left of the Paschen minimum above which the breakdown voltage exceeds the excitation voltage available in the resonator structure. The maximum separation distance D2 can be further understood as the distance beyond which the combined thickness of the ion sheaths surrounding the gas plasma discharge is no longer less than the separation distance D2. In accordance with one or more embodiments, the thickness of the ion sheaths depends on the excitation frequency of the lasing medium. For an excitation frequency of 81 MHz, a maximum separation distance of 0.3 mm is typical.

In view of the above, the protrusion-type parasitic mode suppressor 509 may improve laser efficiency, as described above in reference to FIGS. 5A-5B. Furthermore, improved beam quality may be achieved by suppressing higher-order modes in the transverse direction parallel to the resonator walls, also as described above in reference to FIGS. 5A-5C. Additionally, in gas discharge lasers, protrusion-type parasitic mode suppressor 509 may be used to facilitate the establishment of the lasing medium by introducing regions of high field for improved breakdown while still reducing the gain in the superfluous regions. For example, regions of high electric field may occur around any sharp points or edges of a parasitic mode suppressor, e.g., near a 90-degree edge or corner. These regions of high electric field may create a region of field that is much more intense than that created by the substantially planar resonator walls thereby improving breakdown in the area or region surrounding the high field regions. The resulting improved breakdown may then have the effect of improving power extraction and/or laser performance, among other things.

In addition, for systems in which the power supply circuitry would not be destroyed by a contact between the two resonator walls, a protrusion-type parasitic mode suppressor may fully span the spacing between the first and second resonator walls. Furthermore, a protrusion-type and/or recess-type parasitic mode suppressor may be shaped so as to achieve a desired capacitance between the first and second elongated planar electrodes 203 and 205. For example, the capacitance of the parasitic mode suppressor may be tuned by varying the cross sectional area A or the gap d, in which case, the capacitance is given by $C = \epsilon_r \epsilon_0 A/d$, where $\epsilon_r$ is the relative permittivity of the gap, $\epsilon_0$ is the permittivity of free space, and A is the area of the protrusion surface at a distance d away from the opposing resonator wall. To this end, the electrically insulating material 511 or 513, e.g., as shown in FIGS. 5D-5E, respectively, may be a dielectric material used to tune the dielectric permittivity of the gap between the elongated planar electrodes within the superfluous region.

Figure 6A:
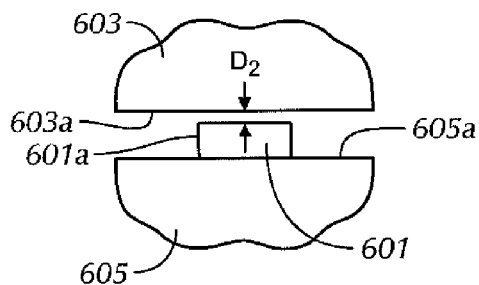
FIGS. 6A-6G show parasitic mode suppressors in accordance with one or more embodiments of the invention.
Figure 6B:
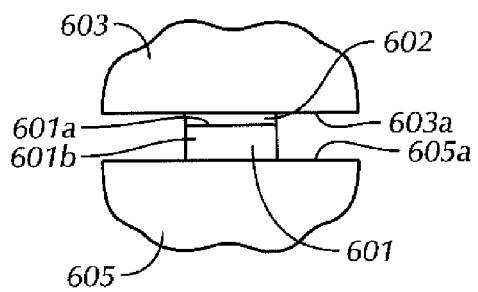
Figure 6C:
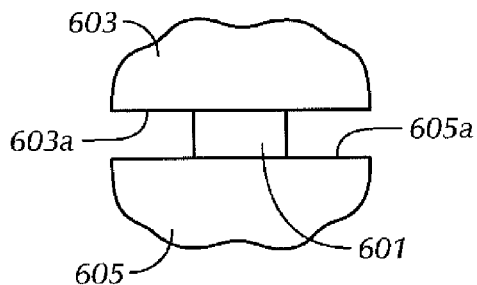
Figure 6D:
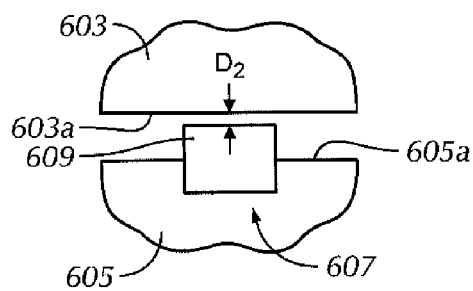

FIG. 6A-6G show parasitic mode suppressors in accordance with one or more embodiments. Parasitic mode suppressor 601 may be an insert 609 that is formed separately from, and then disposed between, the surfaces 603a, 605a, of the resonator walls 603, 605, respectively, as shown in Formed as a separate entity from the resonator walls 603 and 605, an insert-type parasitic mode suppressor 601 may advantageously be made out of any appropriate material. For a choice of the insert material requiring electrical isolation, e.g., if a metal is used to form the insert, a distance D2 may separate the insert-type parasitic mode suppressor 601 from the opposing resonator, e.g., wall 603a in FIG. 6A. In addition, in a manner similar to that described above in reference to FIGS. 5A-5E, a separation distance D2 between the wall 601a of the insert-type parasitic mode suppressor 601 and the opposing resonator wall surface 603a may be chosen to suppress a gas discharge, thereby suppressing parasitic and higher order resonator modes. Furthermore, the gap D2 may be used to tune the capacitance between electrodes if desired. Furthermore, the shape of the parasitic mode suppressor may be used to introduce higher field regions, if desired. Furthermore, as shown in FIG. 6B, an electrically insulating material 602 may be disposed between the upper surface 601a of the insert-type parasitic mode suppressor and the opposing resonator wall 603a as shown in FIG. 6B. Likewise, the insulating material 602 may be disposed between the lower surface 601b of the insert-type parasitic mode suppressor and the opposing resonator wall 605a without departing from the scope of the present disclosure. In addition, if electrical isolation between the walls is not necessary, or even if electrical isolation between the walls is necessary, but the insert itself is made entirely from an insulating material, the insert-type parasitic mode suppressor 601 may span the entire gap between the walls 603a and 605a of the resonator 603 and 605, respectively, as shown in FIG. 6C.

Figure 6E:
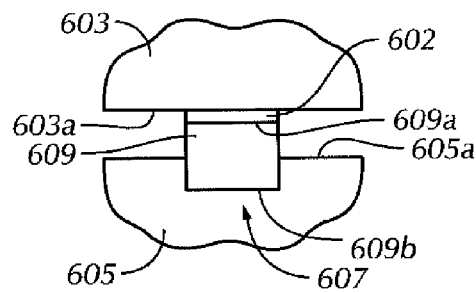

FIG. 6D-6G show other embodiments of insert-type parasitic mode suppressors. In these embodiments, the parasitic mode suppressor may be an insert 609 that is formed separately and inserted into one or more recesses 607 in one or more resonator walls. As already described above in reference to FIGS. 6A-6E, if the insert material requires electrical isolation, e.g., if a metal is used to form the insert, a distance D2 may separate the insert-type parasitic mode suppressor 609 from the opposing resonator wall, e.g., wall 603a in FIG. 6D. Furthermore, as shown in FIG. 6E, an electrically insulating material 602 may be disposed between an upper surface 609a of the insert-type parasitic mode suppressor and the surface 603a of the opposing resonator wall 603.

Figure 6F:
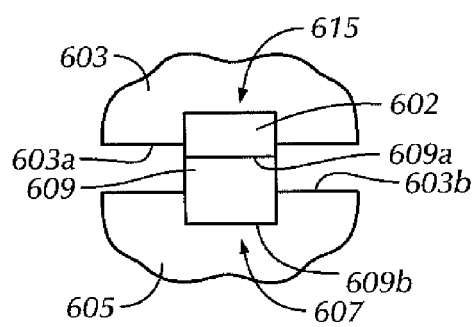
Figure 6G:
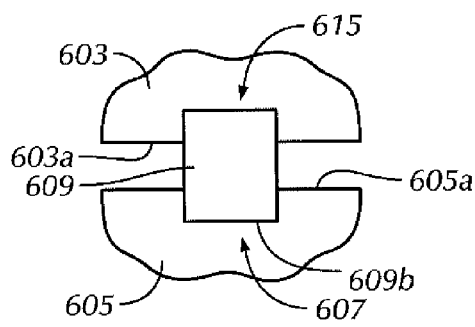

Likewise, the electrically insulating material 602 may be disposed between a lower surface 609b of the insert-type parasitic mode suppressor and the surface 603b of the opposing resonator wall 603. Similarly, as shown in FIG. 6F, an electrically insulating material 602 may be disposed between an upper (or lower) surface 601a of the insert-type parasitic mode suppressor and within a recess in a resonator wall, e.g., recess 615 on resonator wall surface 603a. In addition, if electrical isolation between the walls is not necessary, or even if electrical isolation between the walls is necessary, but the insert itself is made entirely from an insulating material, the insert-type parasitic mode suppressor 609 may span the entire gap between the walls 603a and 605a of the resonators 603 and 605, respectively, and may also fit within recesses 607 and 615 formed within the resonator walls 603a and 605a, respectively, as shown in FIG. 6G.

Figure 7A:
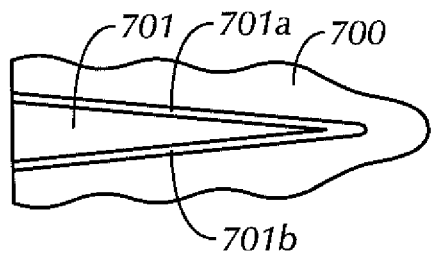
FIGS. 7A-7C show parasitic mode suppressors in accordance with one or more embodiments of the invention.
Figure 7B:
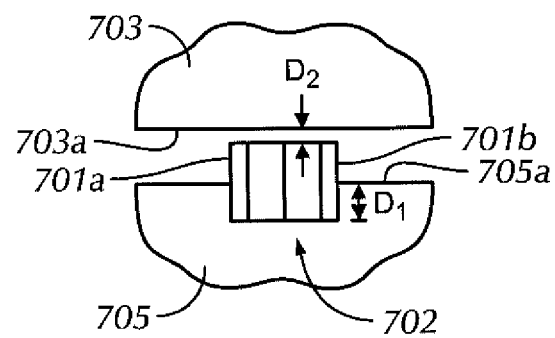
Figure 7C:
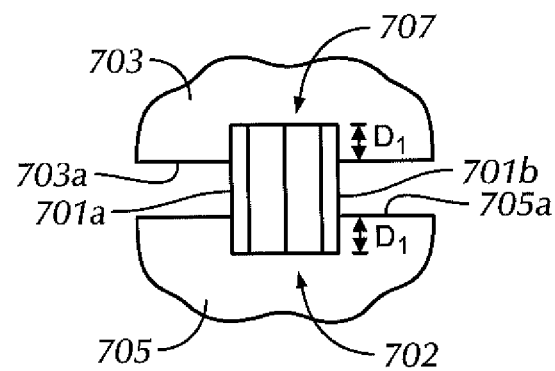

FIG. 7A shows a top view of a hollow parasitic mode suppressor 701 formed from walls 701a and 701b that are disposed within a recess that is located in resonator 700. FIG. 7B shows a cross-sectional view of the same hollow parasitic mode suppressor 701. Similar to the embodiments described above, in gas discharge lasers, the depth D1 of the recess 702 may be chosen so as to substantially reduce or eliminate a gas discharge within the superfluous region. Furthermore, similar to that described above in reference to FIGS. 6A-6E, if the resonator walls 703a and 705a require electrical isolation from each other, e.g., if a metal is used to form the insert walls 701a and 701b, a distance D2 may separate the insert-type parasitic mode suppressor 701 from the opposing resonator wall, e.g., wall 703a in FIG. 7B. In addition, if electrical isolation between walls 703a and 705a is not necessary, or even if electrical isolation between the walls is necessary, but the insert itself is made entirely from an insulating material, the insert-type parasitic mode suppressor 701 may span the entire gap between the walls 703a and 705a and/or may also fit within recesses 702 and 707 formed within the resonator walls 705 and 709, respectively, as shown in FIG. 7C.

Figure 8A:
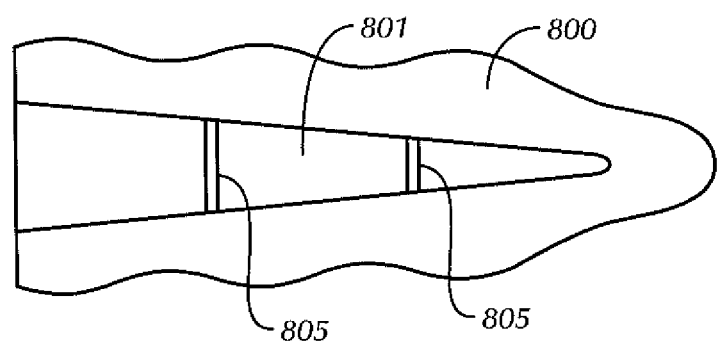
FIGS. 8A-8B show parasitic mode suppressors in accordance with one or more embodiments of the invention.
Figure 8B:
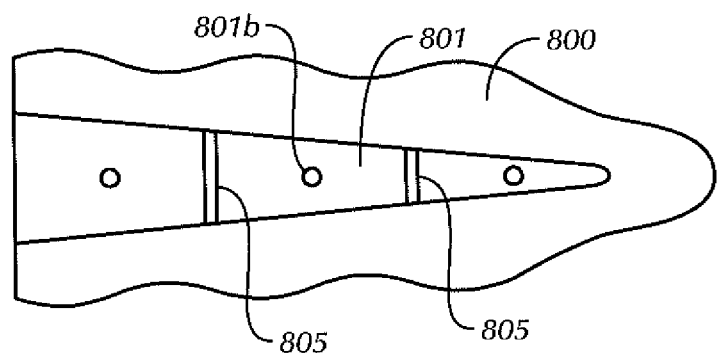

FIGS. 8A-8B are top views of parasitic mode suppressors of either the protrusion-type or insert-type. In FIG. 8A, the protrusion/insert type parasitic mode suppressor 801 may be either formed directly out of the resonator wall surface 800 or may be formed separately and adhered onto the resonator wall surface 800 using an appropriate adhesive. In addition, the protrusion/insert type parasitic mode suppressor 801 may be affixed to, or positioned by fasteners/pins 801b, as shown in FIG. 8B. Furthermore, in all the above examples, it may be the case that the presence of a relatively long protrusion/insert inside a gas discharge volume negatively affects the establishment of the lasing medium due to a restriction of the overall flow of gas through the discharge region. Accordingly, one or more cross-channels 805 may be included in the protrusion/insert-type parasitic mode suppressor 801 to allow gas flow between regions on either side of the mode suppressor. In accordance with one or more embodiments, the cross-channels channels may serve as vents and also allow for improved pulsing performance of the laser employing the resonator.

In accordance with one or more embodiments, a parasitic mode suppressor may be formed directly from, or be affixed to, one or more ends of a resonator wall and also may be formed directly from, or be affixed to, one or more extension members, as described below in reference to FIGS. 9-12. As referred to herein, the term extension-type parasitic mode suppressor includes both parasitic mode suppressors that are formed directly from, or affixed to, one or more ends of a resonator wall and also includes parasitic mode suppressors formed directly from, or affixed to, one or more extension members that are arranged near or at the longitudinal ends of the resonator walls. Furthermore, in the embodiments that follow, the resonator walls and/or the surfaces of the extension members may or may not constitute waveguide walls. Furthermore, in accordance with one or more embodiments, the parasitic mode suppressors may be formed from any reflecting, light-absorbing and/or light scattering material. The parasitic mode suppressor may be made out of a metal material, such as aluminum, or a ceramic material, such as alumina, or any combination thereof. Furthermore, metallic parasitic mode suppressors may be anodized or non-anodized. In accordance with one or more embodiments, a parasitic mode suppressor made out of reflective material may be shaped so as to reflect light away from a parasitic oscillation. Generally, the material(s) used for the parasitic mode suppressor may absorb, scatter, or deflect light that would otherwise contribute to a parasitic mode, without interfering with proper laser operation.

Figure 9A:
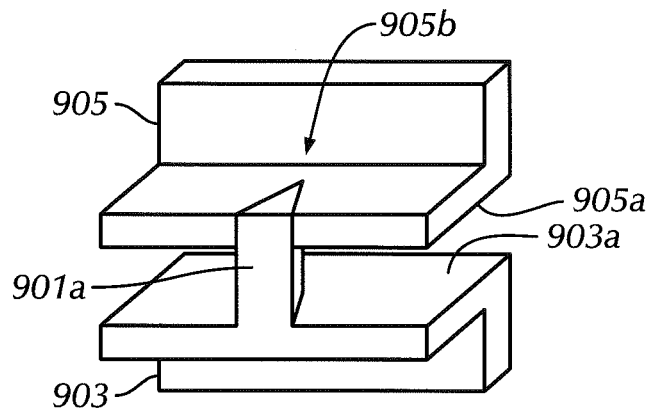
FIGS. 9A-9C show parasitic mode suppressors in accordance with one or more embodiments of the invention.
Figure 9B:
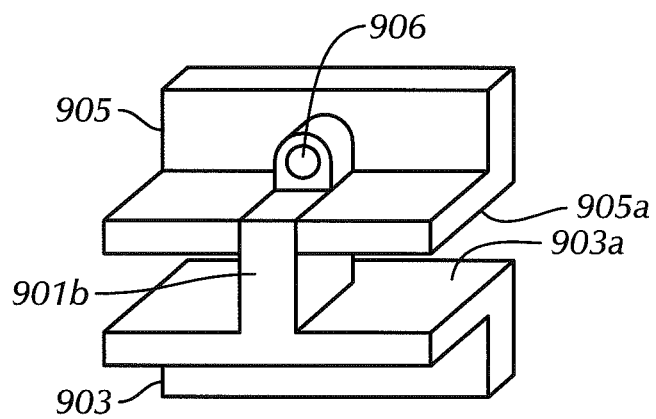
Figure 9C:
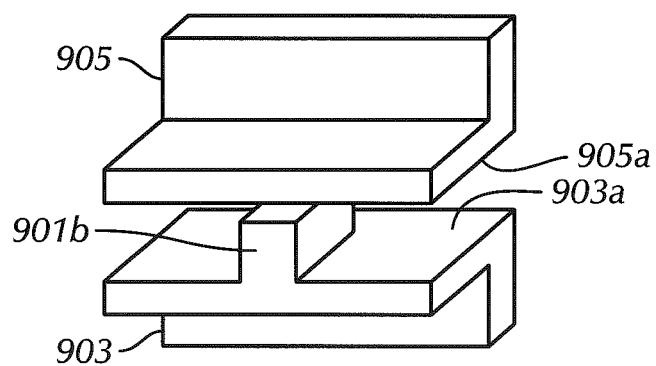

FIGS. 9A-9C show extension-type parasitic mode suppressors in accordance with one or more embodiments of the invention. The parasitic mode suppressors 901a and/or 901b may be mounted outside a laser gain medium within a pair of extension members, e.g., the pair extension members 227 and 229 or 231 and 233, as shown in FIG. 2A. Furthermore, these extension-type parasitic mode suppressors may be arranged similarly to the parasitic mode suppressors 413b and 413c shown in FIG. 4B and may be arranged similarly to 423b shown in FIG. 4C and 423 shown in FIG. 4D. For example, in FIGS. 10-12 described below, the extension-type parasitic mode suppressors are disposed between a longitudinal end of an elongated resonator wall and a mirror 1001, which may correspond to any of the multi-folding mirrors described above in reference to FIGS. 2-4. Accordingly, these extension-type parasitic mode suppressors may be employed separately or in combination with parasitic mode suppressors that are disposed within the laser gain medium, e.g., the mode suppressors described above in reference to FIGS. 5-8. Furthermore, the following embodiments may also include a pair of resonator walls and/or a pair of extension member surfaces. These resonator walls and/or extension member surfaces may or may not serve as waveguide walls in the transverse direction.

Returning to FIGS. 9A-9C, in accordance with one or more embodiments, the extension-type parasitic mode suppressors 901a and/or 901b may be formed directly out of any part upon which they reside. For example, as shown in FIG. 9A, the extension-type parasitic mode suppressors 901a may be formed from the same structural piece, i.e., it may be an integrated part of, an L-shaped extension member 903. However, one or more embodiments of the invention are not limited to L-shaped extension members and any suitable shape may be used without departing from the scope of the present disclosure. Furthermore, as shown in FIG. 9A, the extension-type parasitic mode suppressors 901a may extend across the gap 907 formed between the two opposing extension surfaces 903a and 905a, of extension members 903 and 905, respectively. Furthermore, in accordance with one or more embodiments, the extension-type parasitic mode suppressors 901a may fit within a recess, or notch 905b formed within the extension surface 905a. Furthermore the extension-type parasitic mode suppressors 901a may be triangular in cross-section and thus, the notch 905b may be a similarly shaped triangular notch. However, an extension-type parasitic mode suppressor may have any cross-sectional shape and length without departing from the scope of the present disclosure. For example, FIG. 9C shows a parasitic mode suppressor having a length that extends only partially between two extension surfaces 903a and 905a.

Alternatively, in accordance with one or more embodiments, the extension-type parasitic mode suppressor may be formed separately as an insert 901b and then affixed to an extension member 905 with a fastener 906, as shown in FIG. 9B, or may held in place by an adhesive, bonding, or friction. Furthermore, although FIGS. 9A-C show an extension-type parasitic mode suppressor disposed at the outer region of the extension surfaces, an extension-type parasitic mode suppressor may be disposed in any region of the extension surfaces without departing from the scope of this disclosure.

Figure 10A:
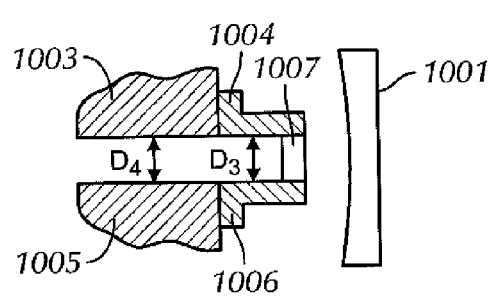
FIGS. 10A-10J show parasitic mode suppressors in accordance with one or more embodiments of the invention.

FIGS. 10A-10D show extension members having extension-type parasitic mode suppressors attached thereto. In each example, the extension members 1004 and 1006 that house the parasitic mode suppressors 1007 are disposed between the longitudinal ends of the elongated resonator walls 1003 and 1005 and the mirror 1001. As in FIG. 10A, extension members 1004 and 1006 include at least one parasitic mode suppressor 1007 that can be affixed directly to the extension members 1004 and 1006. The extension members 1004 and 1006 are themselves directly fixed to the ends of the resonator walls 1003 and 1005. While the example shown in FIG. 10A shows the parasitic mode suppressor 1007 as a separate insert that may be fixed between extension members 1004 and 1006, the parasitic mode suppressor 1007 may be alternately formed directly from the same structure as the extension member, like that shown in FIG. 9A. For embodiments where the resonator is part of a gas discharge laser resonator, some embodiments may employ conductive resonator walls 1003 and 1005. In these cases, the gas discharge between the extension members 1004 and 1006 may be suppressed if the extension members 1004 and 1006 are formed out of nonconductive material. For nonconductive resonator walls 1003 and 1005, the extension members 1004 and 1006 may be made out of either nonconductive or conductive material.

Figure 10B:
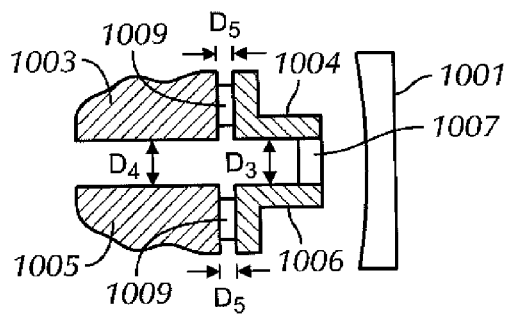
Figure 10C:
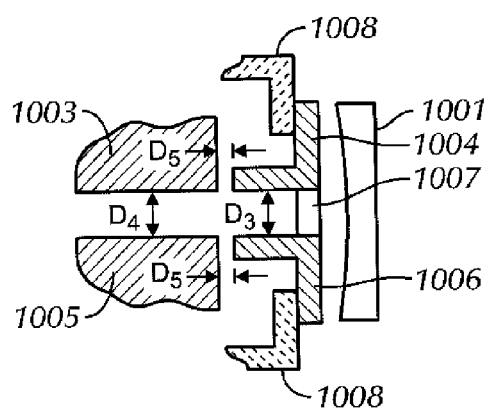
Figure 10D:
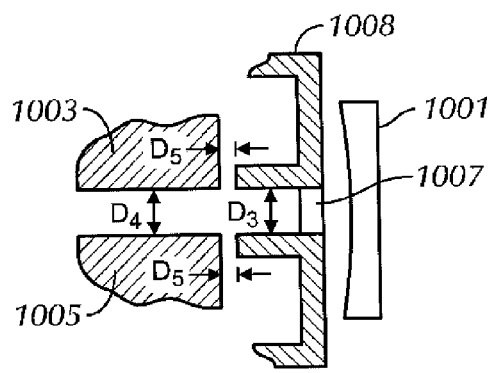

In accordance with one or more embodiments, the gas discharge laser may employ conductive resonator walls in the form of electrodes. Accordingly, FIGS. 10B-10D show illustrative embodiments that address the problem of electrically isolating the extension members 1004 and 1006 from the electrodes. In the embodiments shown in FIG. 10B, the extension members 1004 and 1006 are spaced off from the ends of the resonator walls 1003 and 1005, respectively, by a distance D5. Furthermore, the gap distance D5 may be filled with an electrically insulating material layer 1009. As before at least one parasitic mode suppressor 1007 may be positioned within the gap between the extension members 1004 and 1006. The distance D5 may be chosen to prevent a discharge from occurring between the ends of the resonator walls 1003 and 1005 and the extension members 1004 and 1006. Alternatively, the extension members 1004 and 1006 may be formed from portions of the housing 1008 and kept a distance D5 away from the ends of the resonator walls 1003 and 1005, as shown in FIGS. 10C and 10D. Accordingly, the electrical isolation of the extension members 1004 and 1006 may be maintained. As before, the distance D5 may be chosen to prevent a discharge. FIG. 10F shows yet another embodiment where the extension members 1004 and 1006 may be formed from portions of a mirror mount 1010 and kept a distance D5 away from the ends of the resonator walls 1003 and 1005.

Figure 10E:
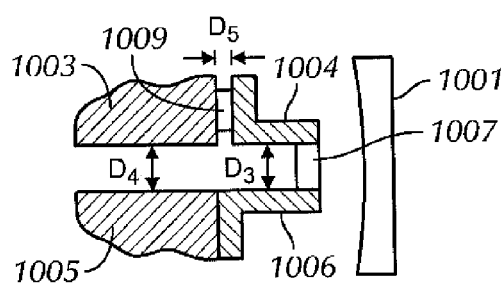
Figure 10F:
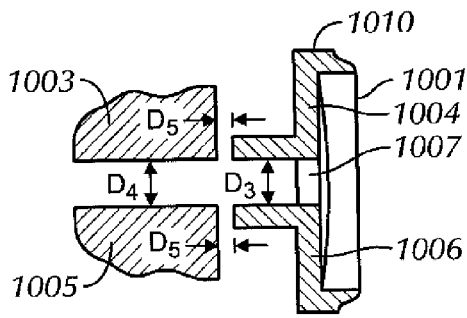

FIG. 10E shows one embodiment that may be employed in the case of a system in which one resonator wall is a grounded electrode. In this embodiment, any combination of an electrically insulated extension member 1004 affixed to an excited resonator wall 1003 and a non-insulated extension member 1006 affixed directly to the grounded resonator wall 1005 may be used. As before, at least one parasitic mode suppressor 1007 may be located within the gap between the extension members 1004 and 1006.

In accordance with one or more embodiments, the gaps shown in the drawings are not intended to limit the arrangement of the electrodes or the extension members but are shown merely for purposes of example. In actuality, the spacing D3 between the extension members 1004 and 1006 may be less than, greater than, or equal to the spacing D4 between the resonator walls 1003 and 1005.

Figure 10G:
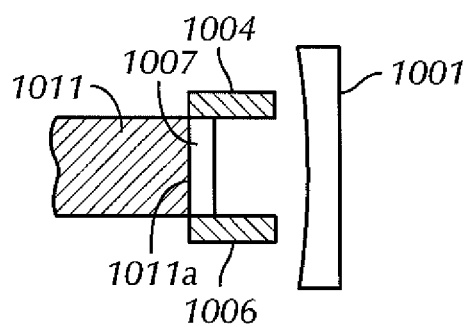
Figure 10H:
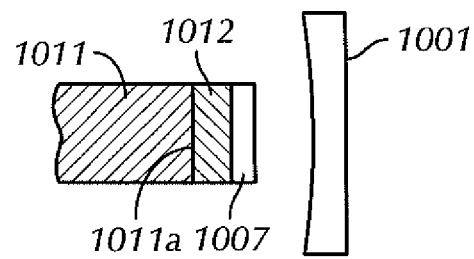
Figure 10I:
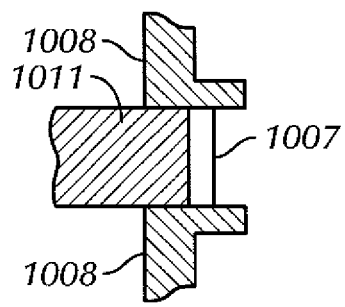
Figure 10J:
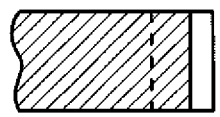

FIGS. 10G-10J show extension members that may be employed for use with a solid-state lasing medium. As shown in FIG. 10G, extension members 1004 and 1006 include at least one parasitic mode suppressor 1007 and may extend from a longitudinal end of solid-state lasing medium 1011. In accordance with one or more embodiments, the extension members 1004 and 1006 may be supported either from a housing encapsulating the solid-state lasing medium or by the end 1011a of the solid-state lasing medium 1011. For example, FIG. 10I shows a parasitic mode suppressor 1007 that is supported by a housing 1008 that surrounds the solid state lasing medium 1011. Furthermore, FIG. 10J shows another solid-state embodiment having a solid-state crystal with a gain portion and front and rear extension portions that are formed as part of the solid-state crystal. The gain medium portion is the only portion of the solid-state crystal that is excited such as through optical pumping via a flashlamp or laser diode. A parasitic mode suppressor is then embedded in or affixed to the non-excited portion of the solid-state crystal. Alternatively, as shown in FIG. 10H, a non-excited portion of solid-state material 1012 may abut the longitudinal end 1011a of the solid-state lasing material 1011. The non-excited portion of solid-state material 1012 may itself abut, or contain, at least one parasitic mode suppressor 1007, thereby forming a mode-suppressing extension portion. For example, a non-excited extension portion may comprise an abutting non-lasing material or a portion of the solid-state material that is not pumped and therefore does not constitute a gain media portion.

Figure 11A:
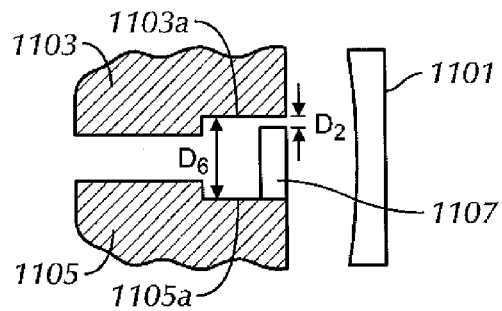
FIGS. 11A-11H show parasitic mode suppressors in accordance with one or more embodiments of the invention.
Figure 11B:
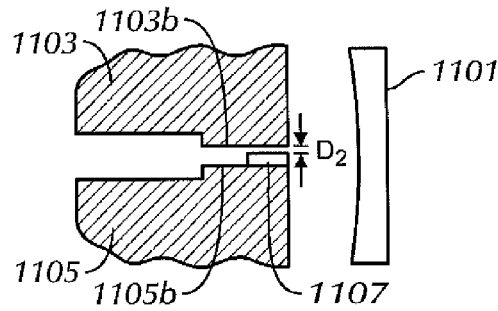

FIG. 11A-11E show parasitic mode suppressors that are mounted to the end of a resonator surface in accordance with one or more embodiments. FIG. 11A shows extension surfaces in the form of shelves 1103a and 1105a, that are formed within the longitudinal ends of resonator walls 1103 and 1105, respectively. In accordance with one or more embodiments, the resonator walls 1103 and 1105 may be the walls of elongated planar electrodes like those described above in reference to FIG. 2A or alternatively may be the inner walls of the open ended ceramic resonator cavity like that shown in FIG. 2B. In either case, at least one of the shelves 1103a and 1105a has affixed thereto at least one parasitic mode suppressor 1107, as shown in FIG. 11A. In accordance with one or more embodiments, the shelves 1103a and 1105a may be formed directly into the ends of the resonator walls 1103 and 1105. For gas discharge laser embodiments, the shelves 1103a and 1105a may be formed to a depth such that the distance D6 between the shelves 1103a and 1105a is large enough to suppress the gas discharge. For example, as described above in reference to FIGS. 4 and 13, for an excitation level configured for a 2 mm gap between the resonator walls, the distance D6 may be chosen to be 4 mm. The mode suppressor may be affixed by using a fastener, adhesive, friction or, alternatively, be an integral part of or bonded to the extension surface. Alternatively, if the absence of a discharge is not required, the shelf extension surfaces may take the form of protruding shelves 1103b and 1105b, at least one of which has affixed thereto at least one parasitic mode suppressor 1107, as shown in FIG. 11B.

As shown in FIGS. 11A-11B, if electrical isolation between the parasitic mode suppressor 1107 and the opposing shelf is desired, a distance D2 may separate the upper surface of the parasitic mode suppressor 1107 from the opposing shelf. However, a parasitic mode suppressor 1107 may fully span the distance D1 between the shelves if electrical isolation between the resonator walls is not required.

Figure 11C:
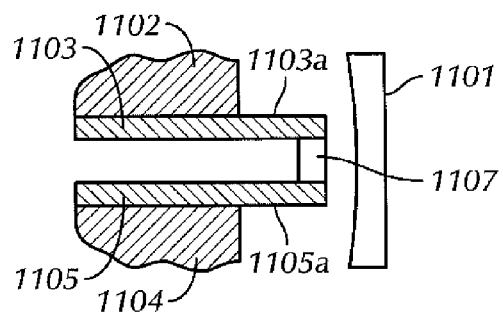
Figure 11D:
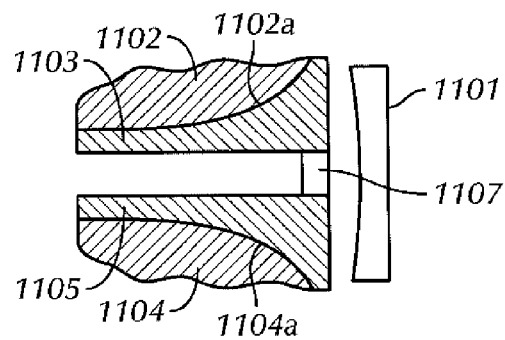

FIGS. 11C-11D show arrangements for a mode-suppressing extension surface in the form of a nonconductive resonator wall in accordance with one or more embodiments. In both FIG. 11C and FIG. 11D, nonconductive resonator walls 1103 and 1105 are attached to the inner surfaces of electrodes 1102 and 1104, respectively. In FIG. 11C, the nonconductive resonator walls 1103 and 1105 extend beyond the longitudinal ends of electrodes 1102 and 1104, respectively, to form a pair of extension surfaces 1103a and 1105a. In accordance with one or more embodiments, extension surfaces may be arranged as shown in FIG. 11D by including a taper 1102a and 1104a at the longitudinal ends of electrodes 1102 and 1104, respectively. Accordingly, the nonconductive resonator walls 1103 and 1105 are shaped having a corresponding complimentary taper so that they abut the tapered electrode walls in the end regions of the electrodes 1102 and 1104. As a result, there exists a region of the resonator walls 1103 and 1105 where a gas discharge is not induced because the gap between the electrode surfaces is too large. In these embodiments, the parasitic mode suppressor 1107 may be attached near the end of the tapered nonconductive resonator walls 1103 and 1105. Thus, in this example, the tapered regions of the nonconductive resonator walls 1103 and 1105 effectively form nonconductive extension surfaces for housing at least one parasitic mode suppressor 1107. In yet another embodiment shown in FIG. 11F, the parasitic mode suppressor 1107 may be attached to one of the surfaces of the tapered ends of electrodes 1102 and 1104 without the need for an additional nonconductive layer like that shown in FIG. 11D.

Figure 11E:
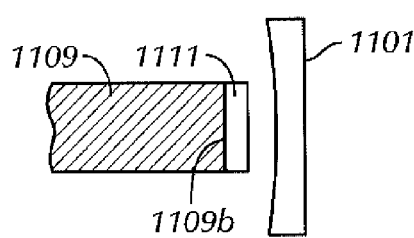
Figure 11F:
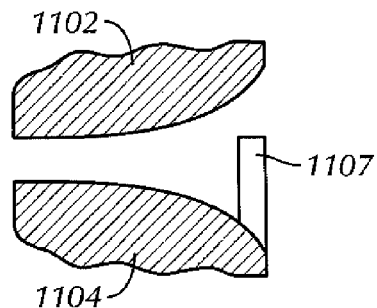
Figure 11G:
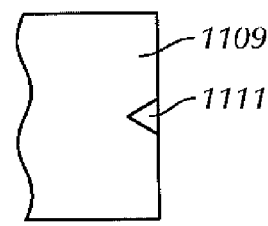
Figure 11H:
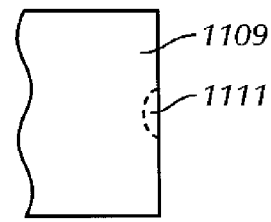

In accordance with one or more embodiments, the parasitic mode suppressor may be used in conjunction with a solid-state gain medium, as shown in FIG. 11E. For example, in this case, the parasitic mode suppressor 1111 is mounted to an end surface 1109b of the solid state gain medium 1109. In accordance with one or more embodiments, the parasitic mode suppressor 1111 may be embedded in the solid-state material or disposed on the outside end surface 1109b, as shown in the top views of FIGS. 11G and 11H. In the top view shown in FIG. 11G, the parasitic mode suppressor 1111 is a triangular-shaped structure that is embedded into the end of the solid state gain medium 1109. As described above, in reference to the other embodiments, this embedded structure may be a recess formed in the gain medium itself. In FIG. 11H, the parasitic mode suppressor 1111 is formed from a non-transmitting region in the gain medium itself, such a region may be formed, e.g., by bleaching that portion of the gain medium 1109.

FIGS. 12A-12E show mode-suppressing shields in accordance with one or more embodiments. For example, FIGS. 12A-12B show a mode suppressing shield 1201 that is positioned near the mirror 1001 and supported from, or is an integrated part of, the housing 1204. FIGS. 12B-12C show a mode suppressing shield 1201 that is positioned near the mirror 1001 and is supported from, or is an integrated part of, the mirror mount 1208. In either case, at least one parasitic mode suppressor 1207 extends from the inner edge of the shield 1201, thereby forming one or more apertures for allowing transmission of the desired laser oscillation. For example, FIGS. 12E-12F show views along the path of the laser beam of two different types of mode suppressing shields 1201 positioned in front of a circular mirror 1001. The mode suppressing shields 1201 include apertures 1201a and 1201b for transmitting the laser beam that corresponds to the desired laser oscillation (represented by the dotted ellipses and circles in FIGS. 12E and 12F, respectively). For example, the position of the apertures 1201a and 1201b may correspond to outer portions 411a and 411b of the turning mirror 411, as shown in FIG. 4C. Likewise, the parasitic mode suppressors 1207 may be positioned in front of one or more portions of mirror 1001 so as to block the development and propagation of one or more parasitic modes. In other words, the parasitic mode suppressors 1207 while part of a shield 1201 are still located at one or more superfluous regions, as described above, e.g., in FIGS. 4A-4C. Furthermore, while the parasitic mode suppressors 1207 are shown in FIGS. 12E-12F as integrated with the shield 1201, other structural arrangements are possible without departing from the scope of the present disclosure. For example, the parasitic mode suppressors 1207 may be a separate structure that is formed of a different material from the shield 1201 and then affixed to the shield using an appropriate adhesive and/or fastener.

Figure 12G:
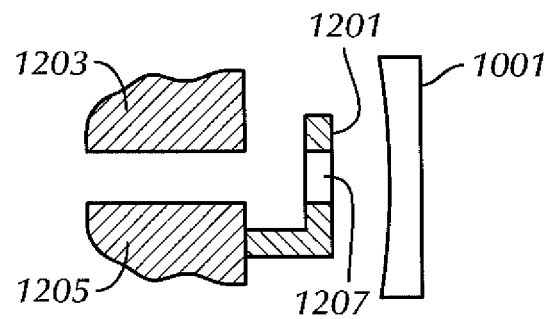
Figure 12H:
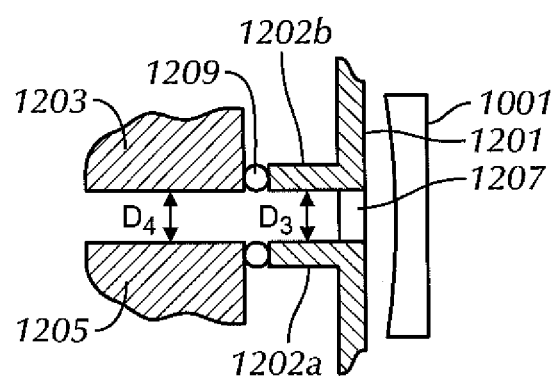

In addition, the shield 1201 may be supported from one of the resonator walls, e.g., resonator wall 1205, as shown in FIG. 12G. FIG. 12H shows another embodiment that employs a layer 1209 of electrically insulating material that is arranged between the shield 1201 and the resonator walls 1203 and 1205. This embodiment also provides extension members 1202a and 1202b and thus may provide the both the benefits of the extension members described above in reference to FIGS. 9-12 as well as the benefits of shields described above.

Figure 12I:
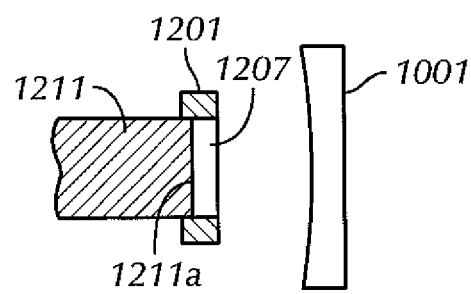

FIG. 12I shows an embodiment of a shield 1201 used in combination with a solid state gain medium 1211. In this solid-state embodiment, the mode-suppressing shield 1201 may be configured near the end 1211a of the solid-state gain medium 1211. The shield 1201 itself is supported from the end 1211a of the solid-state gain medium 1211. Furthermore, any of the shields 1201 described above that are mounted to, or an integrated part of the laser housing and/or mirror mount, may be used in combination with the solid state gain medium without departing from the scope of the present disclosure.

In all of the above examples, the shapes of the parasitic mode suppressors, the shapes of the shield members, and the shapes of any apertures are shown merely for the sake of illustration and thus, these structures may be have any shape (e.g., circular, rectangular, elliptical, triangular, etc.) without departing from the scope of the present disclosure. Furthermore, while the parasitic mode suppressor embodiments above are shown in the context of a stable resonators used in gas discharge and solid state lasers, the parasitic mode suppressors disclosed herein may be used in any laser resonator including unstable resonators without departing from the scope of the present disclosure.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A resonator for a laser comprising:
a first resonator wall;
a second resonator wall that is separated from the first resonator wall in a transverse direction thereby defining a gap between the first and second resonator walls;
a lasing medium disposed in the gap;
a first mirror disposed at a first end of the first and second resonator walls;
a second mirror disposed at a second end of the first and second resonator walls,
wherein the first and second mirror cooperate to fold an intra-cavity laser beam along a plurality of paths through the lasing medium,
wherein the plurality of paths define a boundary of a superfluous region within the resonator, wherein the intra-cavity laser beam does not pass through the superfluous region;
wherein the first mirror and the second mirror forms a laser resonator for a parasitic laser mode, a portion of which is located within the superfluous region;
a parasitic mode suppressor that is located within the superfluous region of the resonator and is disposed between the first end of the first resonator wall and the first mirror.

2. The resonator of claim 1, wherein the parasitic mode suppressor is attached to a surface of a recessed shelf disposed on the first end of the first resonator wall.

3. The resonator of claim 1, wherein the parasitic mode suppressor is attached to a surface of an extension member, and wherein the extension member is disposed proximate to the first end of the first resonator wall.

4. The resonator of claim 1, wherein the parasitic mode suppressor is attached to a surface of a shield member, and wherein the shield member is disposed proximate to the first mirror.

5. The resonator of claim 1, wherein the parasitic mode suppressor is formed from one selected from a group consisting of a metal material and a ceramic material.

6. The resonator of claim 1, wherein the parasitic mode suppressor at least partially blocks a beam path of the parasitic mode.

7. The resonator of claim 1, wherein the lasing medium is a gas plasma discharge medium.

8. The resonator of claim 7, wherein the resonator walls are excited by opposing surfaces of a pair of electrodes and the extension surface is defined by a region on the resonator walls extending beyond at least one of the first and second ends of the electrodes.

9. The resonator of claim 1, wherein the parasitic mode suppressor is attached to an extension surface that is a protruding shelf formed out of the first end of the first resonator wall.

10. The resonator of claim 1, wherein the parasitic mode suppressor is attached to an extension surface that is disposed between the first end of the first elongated resonator wall and the first mirror.

11. The resonator of claim 1, wherein the parasitic mode suppressor is attached to a shield member that is disposed proximate to a mirror surface of the first mirror.

12. The resonator of claim 1, wherein the parasitic mode suppressor is disposed between a pair of tapered inner surfaces of the first ends of the first and second resonator walls.

13. The resonator of claim 12, wherein the parasitic mode suppressor is disposed between a pair of tapered inner surfaces of the first ends of the first and second resonator walls and the parasitic mode suppressor is attached to the inner surface via a nonconductive resonator wall that abuts a tapered inner surface of the first end of the first resonator wall.

14. A resonator for a laser comprising:
a lasing medium having a thickness;
a first mirror disposed at a first end of the lasing medium;
a second mirror disposed at a second end of the lasing medium,
wherein the first and second mirror cooperate to fold an intra-cavity laser beam along a plurality of paths through the lasing medium,
wherein the plurality of paths define a boundary of a superfluous region within the resonator, wherein the intra-cavity laser beam does not pass through the superfluous region;
wherein the first mirror and the second mirror forms a laser resonator for a parasitic laser mode, a portion of which is located within the superfluous region; and
a parasitic mode suppressor that is located within the superfluous region of the resonator and is disposed between a first end of the lasing medium and the first mirror.

15. The resonator of claim 1, wherein the lasing medium is a solid state material.

16. The resonator of claim 15, wherein the parasitic mode suppressor is embedded within an end of the solid state gain medium and is a recess formed within the solid state material.

17. The resonator of claim 15, wherein the parasitic mode suppressor is embedded within an end of the solid state gain medium and is a recesses formed from a non-transmitting region within the solid state material.

18. The resonator of claim 15, wherein the parasitic mode suppressor is mounted to an end surface of the solid state gain material.

19. The resonator of claim 14, wherein the parasitic mode suppressor is attached to a surface of an extension member, and wherein the extension member is disposed proximate to the first end of the lasing medium.

20. The resonator of claim 14, wherein the parasitic mode suppressor is attached to a surface of an extension member, and wherein the extension member is disposed proximate to the first end of the lasing medium.

21. The resonator of claim 1, wherein the parasitic mode suppressor is attached to a surface of a shield member, and wherein the shield member is disposed proximate to the first mirror.

* * * * *

UNITED STATES PATENT AND TRADEMARK OFFICE
CERTIFICATE OF CORRECTION

PATENT NO. : 9,281,651 B2  
APPLICATION NO. : 14/265779  
DATED : March 8, 2016  
INVENTOR(S) : Linh K. Nguyen et al.

Page 1 of 1

It is certified that error appears in the above-identified patent and that said Letters Patent is hereby corrected as shown below:

In the Claims:

At column 22, claim number 20, line number 15, "The resonator of claim 14" should read --The resonator of Claim 1--.

Signed and Sealed this  
Fifth Day of July, 2016

Michelle K. Lee  
*Director of the United States Patent and Trademark Office*